Jan. 25, 1966     A. G. BODINE     3,231,025
SONIC SOIL CULTIVATOR
Filed May 26, 1964     8 Sheets-Sheet 6
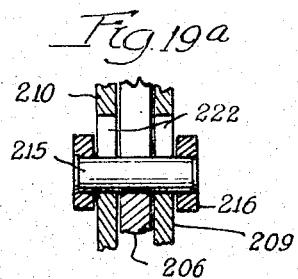
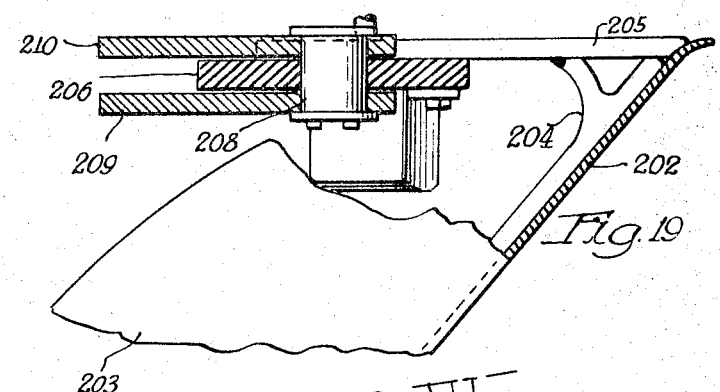
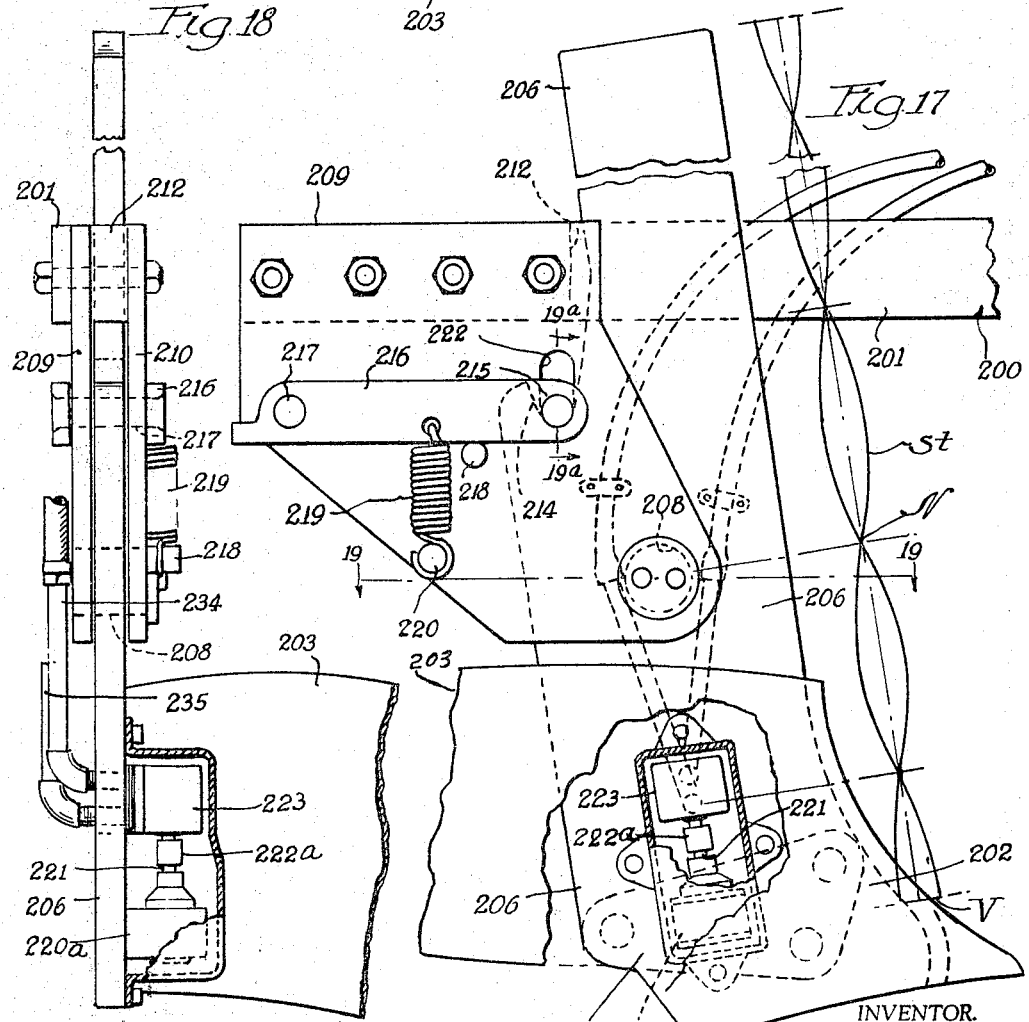
INVENTOR.
Albert G. Bodine
BY
Attorney

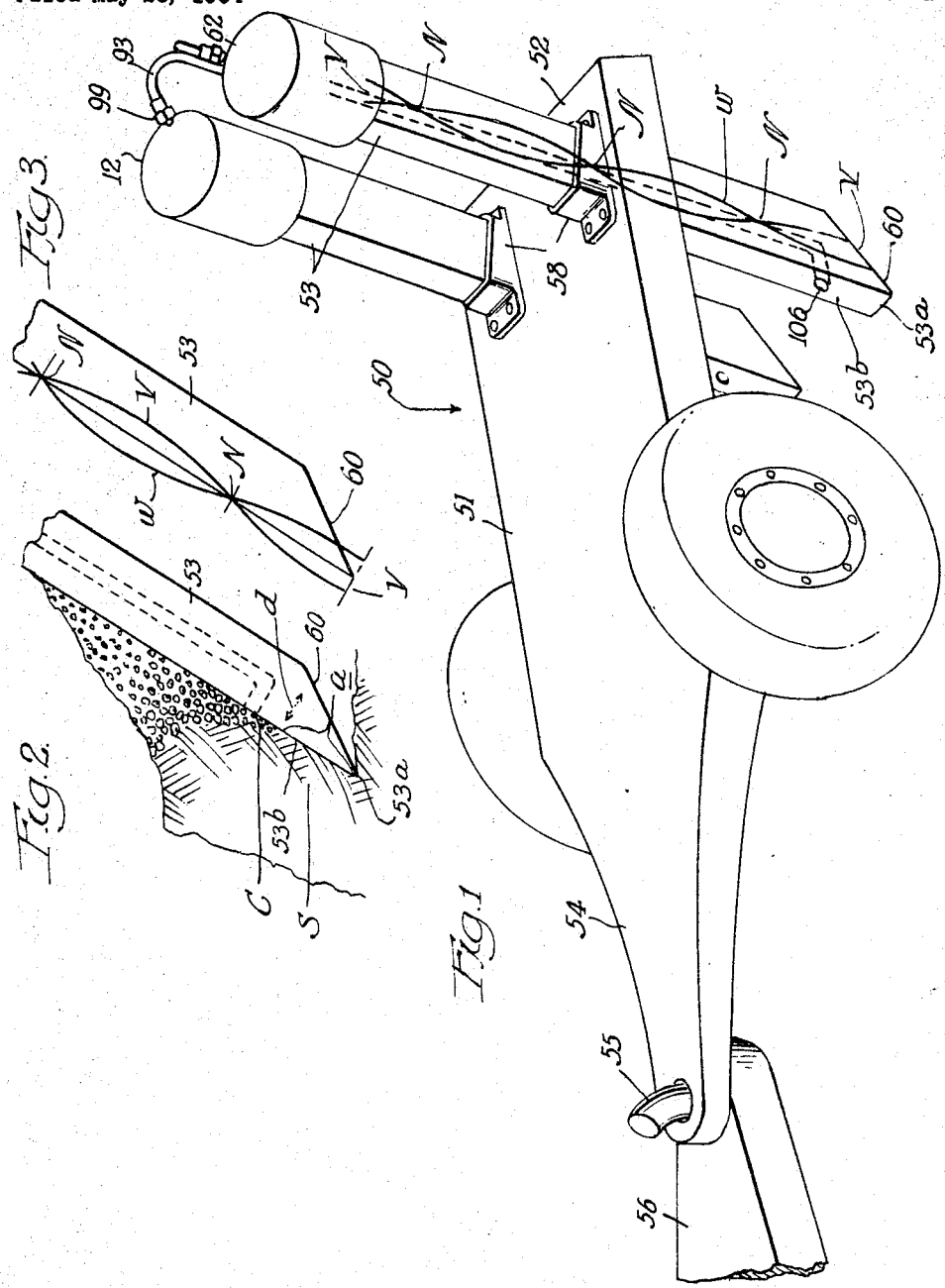

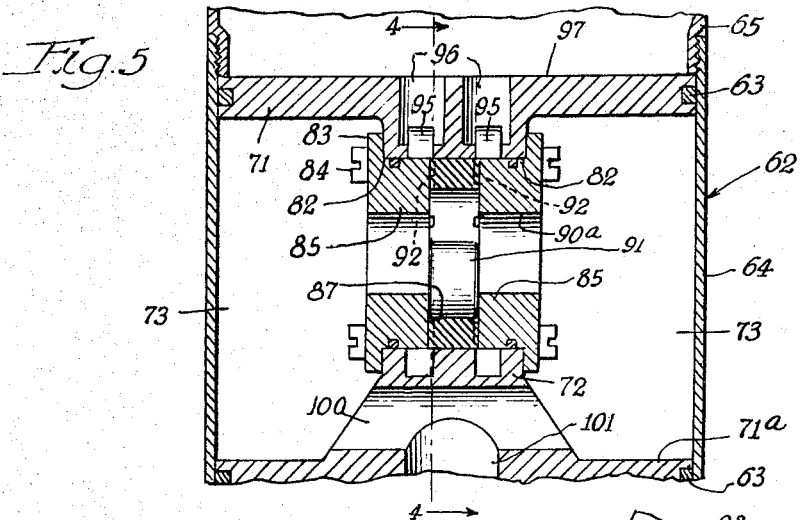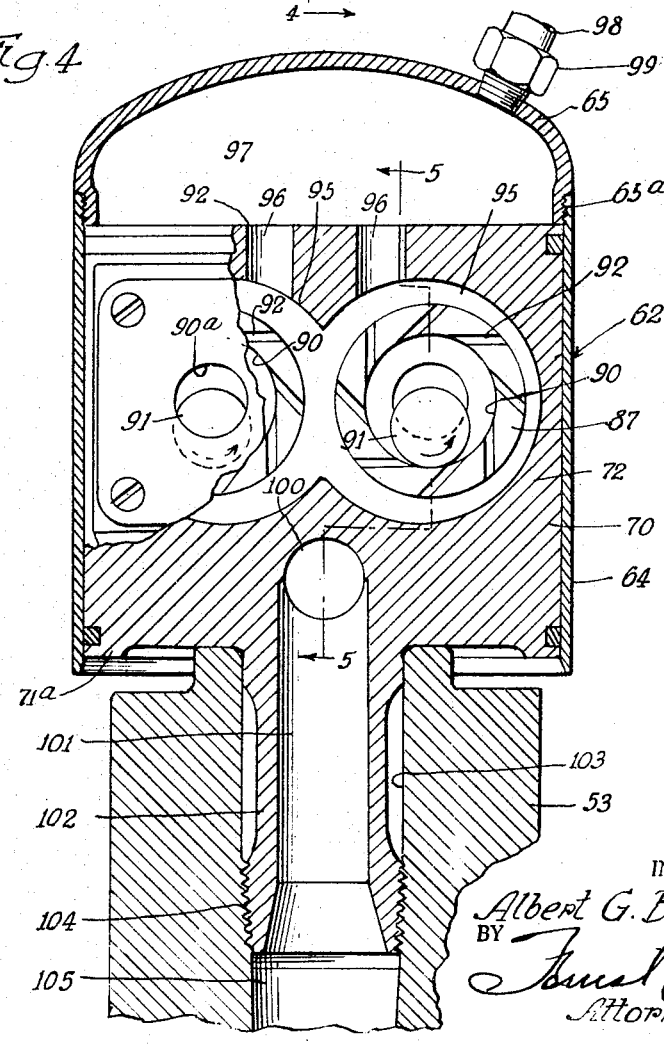

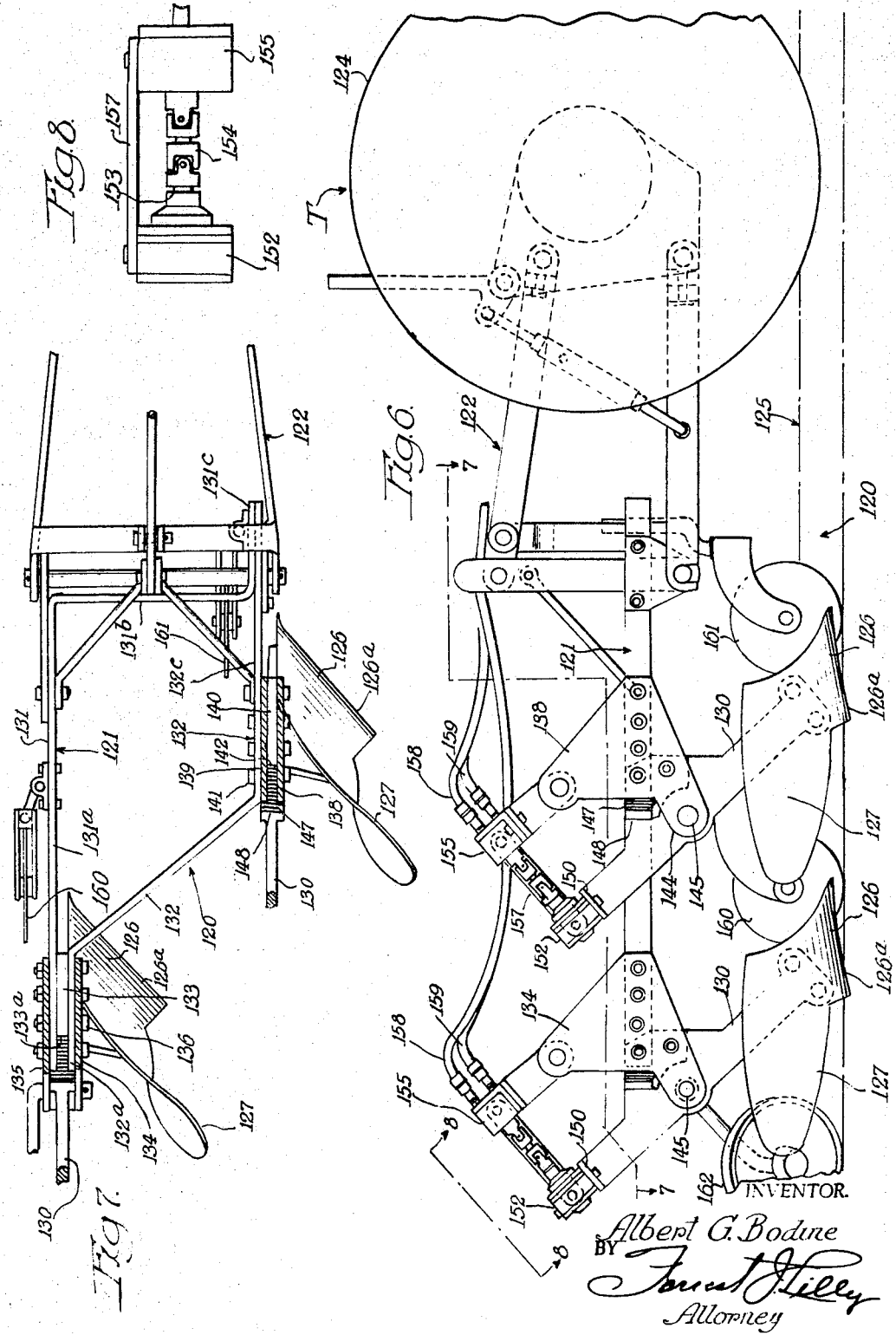

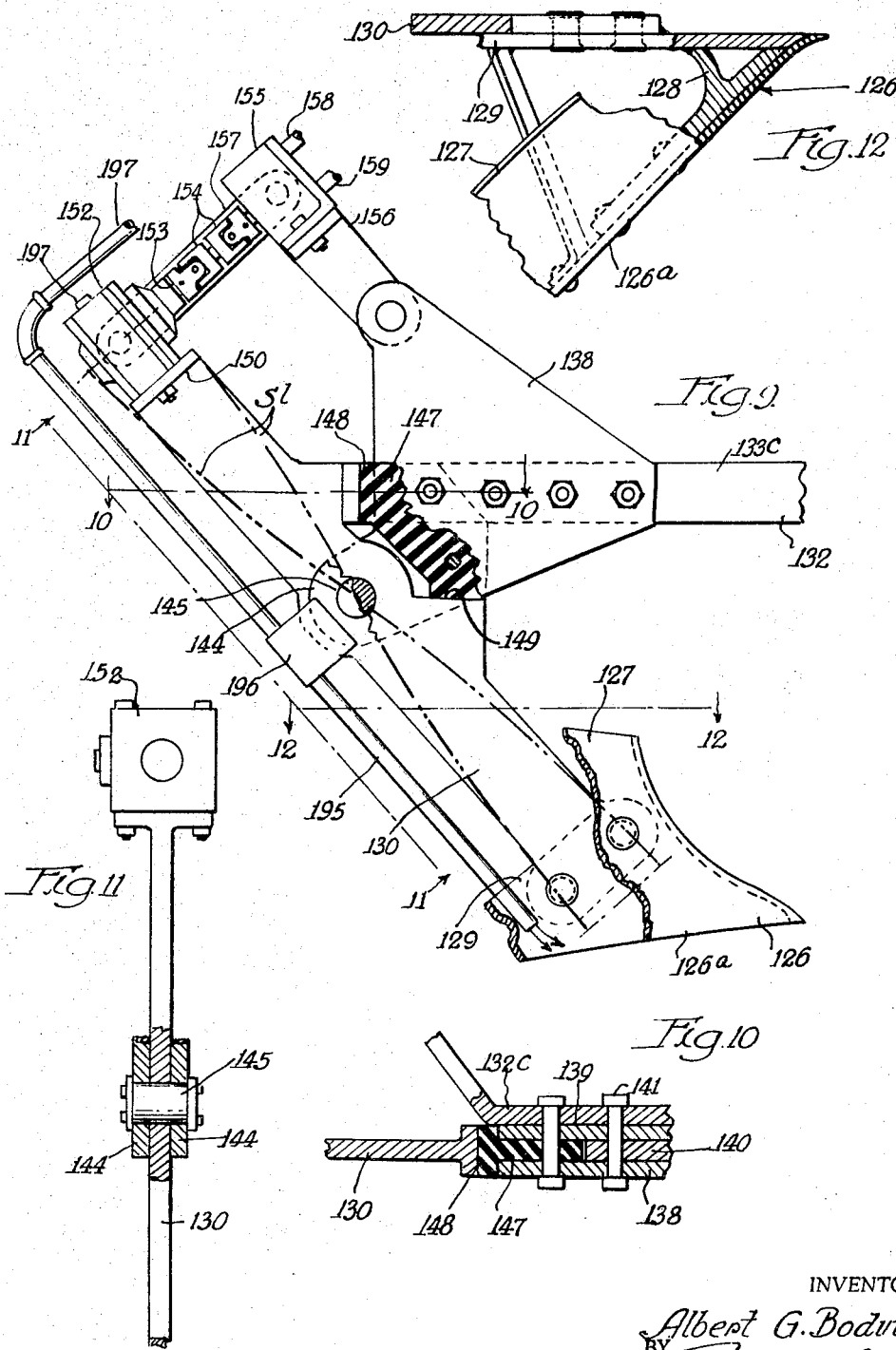

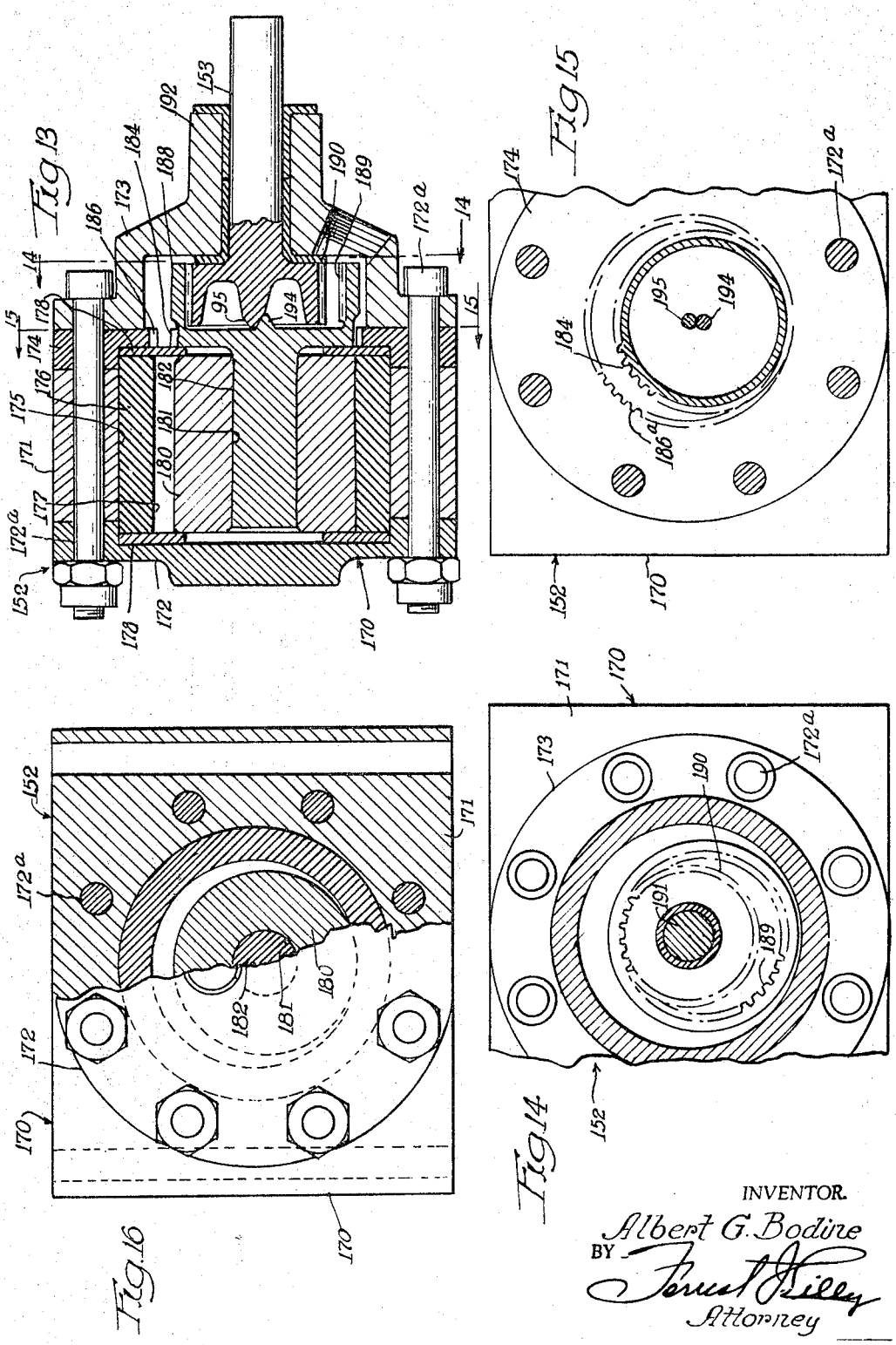

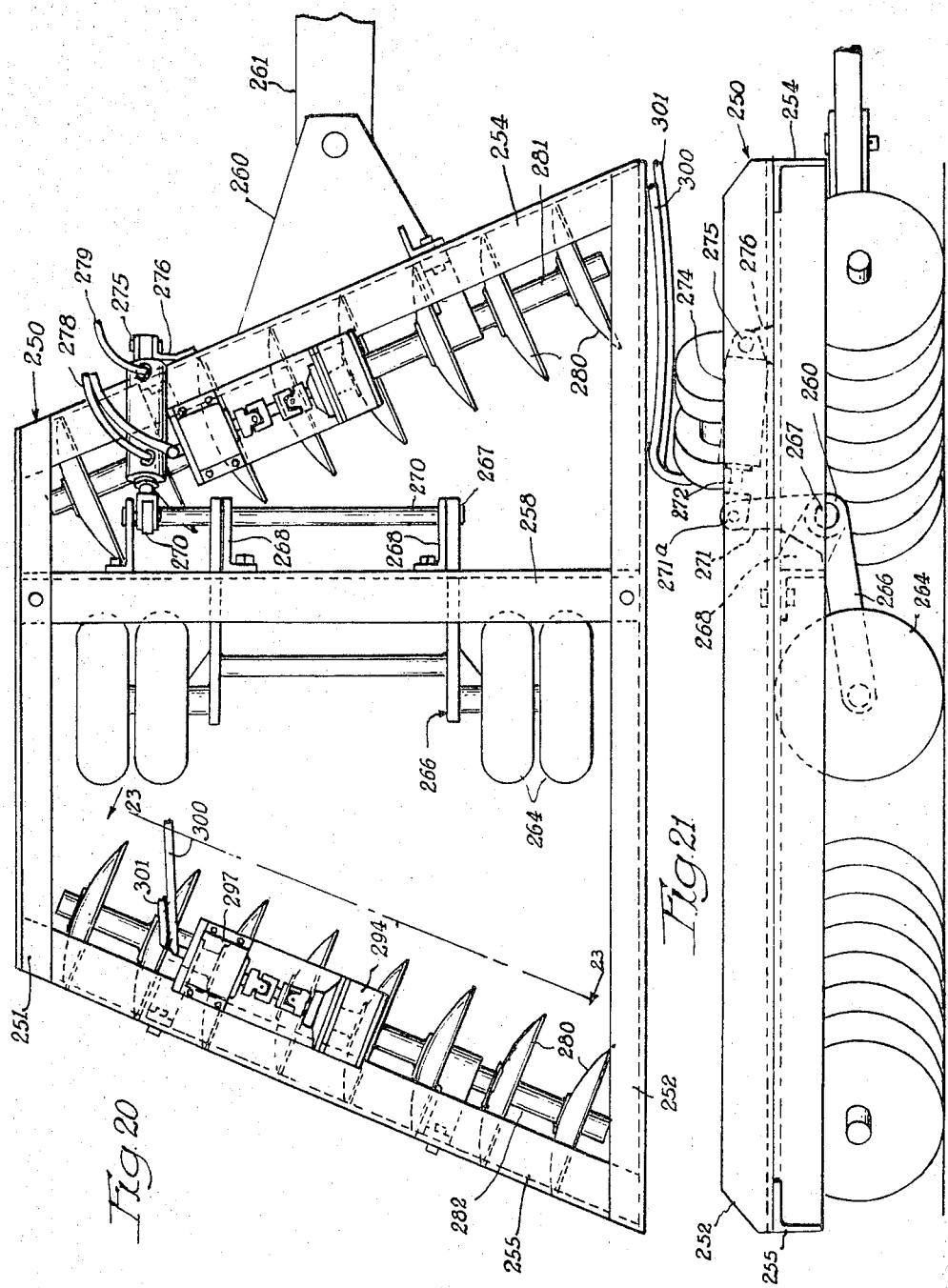

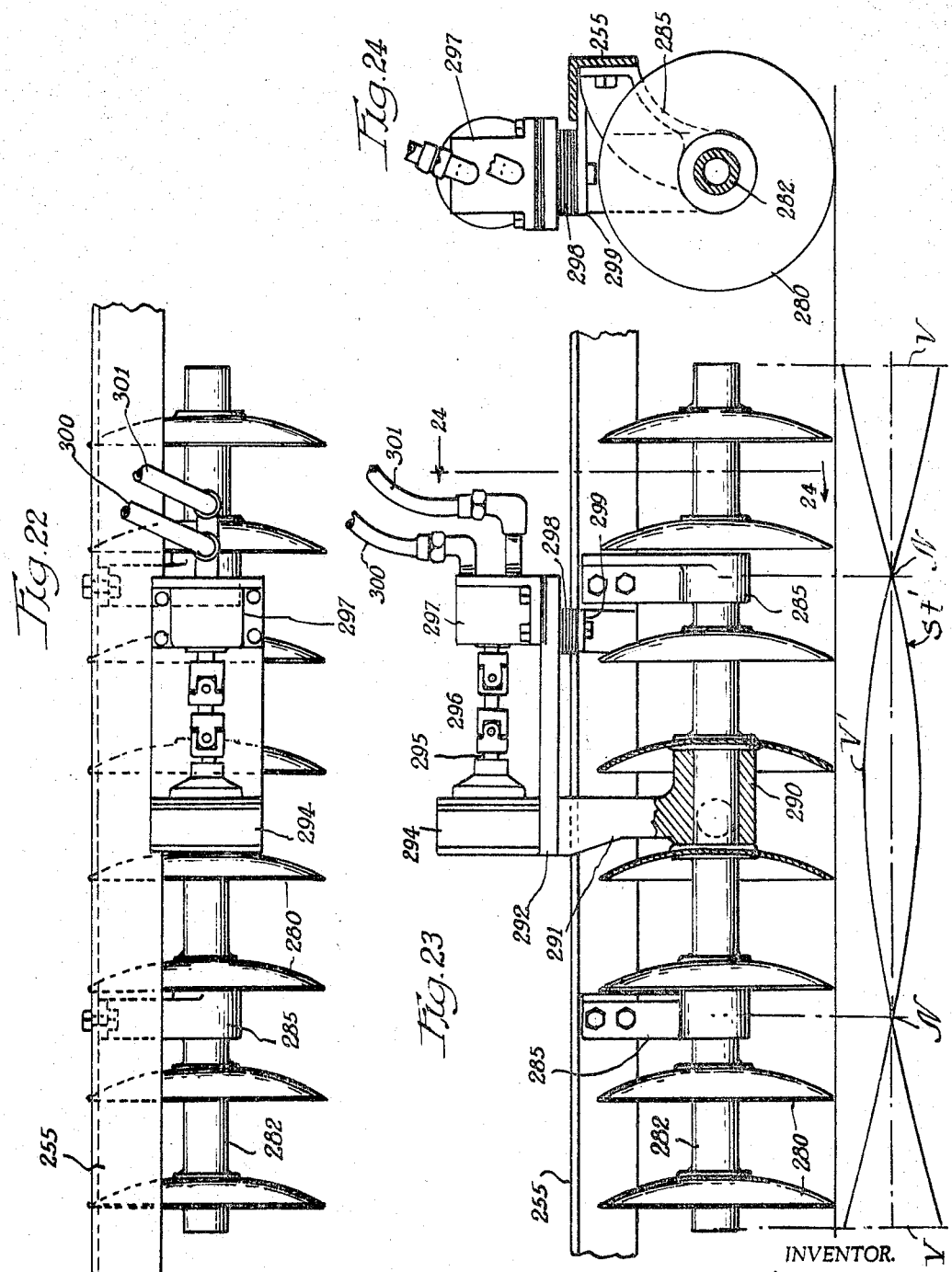

United States Patent Office 3,231,025
Patented Jan. 25, 1966

3,231,025
SONIC SOIL CULTIVATOR
Albert G. Bodine, Los Angeles, Calif.
(7877 Woodley Ave., Van Nuys, Calif.)
Filed May 26, 1964, Ser. No. 370,217
17 Claims. (Cl. 172—40)

The present application is a continuation-in-part of my prior application Serial No. 163,802 filed January 2, 1962, and entitled Sonic Wave Earth Digging and Moving Machine, which was in turn a division of my parent application Serial No. 839,196 filed September 10, 1959, of the same title, now Patent No. 3,030,715. Reference is also made to and incorporated herein by this reference are my copending applications as follows: Sonic Method and Apparatus for Extruding Flowable Materials, Serial No. 756,382, filed August 21, 1958; Rock Crushing Process and Apparatus With Sonic Wave Action, Serial No. 200,019, filed June 5, 1962, now Patent No. 3,131,878, and Crushing Process and Apparatus, Serial No. 341,608, filed January 31, 1964.

This invention is concerned with cultivation of agricultural soil, and deals with application of sonic energy to a cultivator tool for breaking, turning and conditioning of agricultural soil in situ. The invention is to be differentiated from any process or apparatus for removing or transporting the soil to any distance for any purpose, and is confined entirely to localized disturbance or turn-over of the soil accompanied by sonic vibrations and wave radiation for soil conditioning effects.

The general object of the invention and the characterizing feature thereof is to provide for application of sonic energy to the soil during cultivation by setting up sonic vibration, i.e., of an elastic deformation or deflection type, in a sonic cultivating tool to accomplish a number of improvements in the condition of the soil as will be described. The invention is to be distinguished from types of vibrators which have been used in the past either to shake a plow bodily, or to "hammer" against a plowshare and thus shake away adhering soil, and which have none of the characteristic sonic features of various forms of the present invention, such as sonic elastic vibration of the cultivator tool, an ascoustic coupling between a vibration generator and the plowshare, standing wave vibration, vibration at a resonant frequency, cavitation, and effective sound wave radiation into the soil. Such prior art hammering is further characterized as a succession of interrupted or separated blows, as distinguished from a continuous sonic wave, of sinusoidal composition, as is characteristic of the present invention. The present invention may use a continuous sinusoidal wave of a fundamental frequency, or with the inclusion of harmonics, but the wave or vibration is always continuous, or what is known in the art as a "continuous wave," as distinguished from intermittent impacting or hammering.

An object of the invention is to radiate sonic energy into agricultural soil in course of cultivation or turning over where the soil is left substantially in place. A further and related object is to utilize, for radiation of the sonic energy, a cultivator tool which is both shaped so as to stir or turn the soil in place, without transporting it from its generally existing location, and also equipped or adapted to function as a sonic radiation.

Another object is to produce sonic oscillation of a sonic radiation surface on a cultivator tool which moves through the soil with such surface in a submerged position, and with such surface oriented relative to its direction of sonic oscillation so as to activate the localized turning or tilling of the soil, with the sonic energy also serving to additionally condition the soil, as by producing a desirable heating thereof by conversion of sonic energy.

It is an object of the invention to produce localized sonic micromotion of soil particles relative to one another.

A further object of the invention is to cause radiation of sonic energy into the soil from the submerged portion of a soil penetrating cultivator tool.

A feature of the invention is the exertion and maintenance of a steady force or bias on the sonically oscillatory cultivator tool, so that the tool is pressed firmly against the soil, and the super-imposition on this condition of a sonic vibratory action against the soil; also, the maintenance of the amplitude of the sonic vibration or oscillation at such a high level relative to the bias force that the turned portion of the soil is sonically treated as it flows over and leaves the last part of the tilling process.

The present invention is concerned broadly with the application, through the medium of a sonically vibratory cultivator tool, of sonic energy for conditioning agricultural soil, and employs sonic fluidization and sonic propulsion effects in granular soil cultivation. In addition, it employs sonic vibratory energy in a manner which causes heating of the soil, activation of plant and animal organisms, aeration, and reconstitution of the physical nature and characteristics of the soil such as by increasing porosity and creating "softness."

The invention employs or results in a sonic mixing phenomena which can be made to occur in a granular material comprised of soil particles of different sizes, densities, shapes and impedances by coupling to the soil a sonically vibrating cultivator tool. These various particle parameters cause the particles receiving sonic energy from the tool to respond, by undergoing sonic wave action, i.e., sonic elastic vibration, at different energy levels. The result is a high degree of local relative cyclic movements of individual particles, with a substantial variation in the sonic energy thereof as regards the different particle parameters, in such a manner that the particles become considerably reoriented, moved or mixed relatively to one another.

As will appear more fully hereinafter, the most important sonic parameter of the soil particles in the behavior thereof under the conditions imposed by the invention is acoustic impedance, which is defined conventionally as the ratio of oscillatory driving pressure on the particle to resulting oscillatory volume current (product of particle velocity and cross sectional area) when subjected to a sonic "field" and thereby set into vibration. The physical charactertistics of a soil particle which govern its impedance are its inductive reactance or inertia, its capacitative reactance or modulus of elasticity, and its resistance or energy consuming factor, which can be due to internal friction, particle fracturing, or to dissipative randomness as regards the direction of vibration. Hard pan is an example of a soil type of relatively high impedance, and soft loam is a soil type of relatively low impedance. Soil impedance can also be affected by soil pressure, such as an externally applied bias pressure. The three factors of inductive reactance, capacitative reactance and resistance can be present to varying extents with different soil particles; and, moreover, the particles can acoustically respond to a sonic field by elastic vibration (cyclic elastic deformation), or inelastic (bodily) vibration, or a combination of both, depending upon the relative magnitudes of the three factors present.

Also, soil particles can have these acoustic vibratory responses either as individual particles, or as regards compacted groups of particles, such as in compacted earth, ahead of or adjacent the cultivator tool, or in lumps or clods of soil. In the latter case, the individual particles making up a clod, if tightly adherent to one another, may undergo sonic wave movement as or nearly as a homogenous mass, or may move locally, generally in unison, and largely as a homogenous mass, but with individual differentials of vibration amplitude or phase from particle to particle as the individual particles have more or less impedance, density, mass reactance or inertia, modulus of elasticity, and internal resistance. The particles may thus undergo vibratory wave movement largely or strictly together, or with very great differentials of travel (cyclic acceleration, velocity and displacement), depending upon the soil character and the uniformity or non-uniformity of physical characteristics of the soil particles. It will also be seen that attention may be focused on the acoustic impedance of a soil particle, or of the soil treated as made up of a large number of soil particles, and in either case the impedance is the ratio of oscillatory driving pressure to so-called volume current, as defined hereinabove.

In the case of individual soil particles, the acoustic response properties are proportional to what is referred to as "lumped" parameters or constants of individual particles, and a group of adherent particles in a clod will also respond as a "lumped" parameter. Also, these acoustic response properties may be exhibited by the soil acting through a substantial wave path dimension, e.g., a substantial fraction of a wavelength, or a number of wavelengths, presenting these parameters as so-called distributed constants of extended dimensions of the soil.

The result of such sonic action in or on the soil is a substantial reorientation of the soil makeup or structure, involving a very novel and effective type of tilling action. As a result of this process, the soil becomes very compliant and adaptive to plant growth. The soil becomes soft.

The sonic action of the invention is particularly effective in aerating the soil. It also makes the soil very porous, which is desirable for moisture retention.

The method of the invention has application and meaning only in relation to agricultural soils, and the broad novel concept involves application of sonic wave energy to agricultural soils, i.e., soils characterized by a tillable nature, and generally comprised of a mixture of particles of different sizes and other physical characteristics. The soil condition prior to application of the sonic process may be either loose or compacted. The process of the invention is especially effective, however, in the cultivation of soils which have become highly compacted, and thus very poor for agricultural use, in that it loosens, expands and softens such soils. Also, the sonic energy radiated into or transmitted through the soil is dissipated by being converted to heat, thus warming the soil and stimulating beneficial growth organisms in the soil.

Illustratively, the invention involves the generation of powerful sonic oscillations or vibrations in an elastically vibratory member or resonator having a vibratory inertia mass portion associated therewith, the vibrations being powerful and of relatively large amplitude, but safely within the elastic limit of the elastically vibrating member. The elastically vibratory member either includes or mounts a final earth-engaging cultivating tool or element such as a moldboard plowshare or disk which may, or may not, undergo elastic vibration within its own local structure, but which includes a vibratory earth-engaging acoustic coupling and vibration radiation surface. The principal requirement is that there be used a sonic elastically vibratory driving member such as, in an elemental but effective form, an elastic bar which acoustically couples to a radiator sonically engaged into the soil, and this may be by way of a coupling surface on a soil-engaging extremity thereof which participates in the elastically vibratory action, or by way of another example, a discrete earth engaging element such as a plowshare or disk which is driven in vibration by the elastically vibratory driving member, and which itself may either participate in the elastically vibratory action, or, alternatively, vibrate bodily as a "lumped" appendage on the elastically vibratory driving member.

According to one species of the invention, the elastically vibratory member, with its associated mass, may be operated to very great advantage at a resonant frequently thereof. The elastic and mass parts of the system may be "distributed," or "lumped." Particularly at the lower operating frequencies, vibration may be engendered in the apparatus which causes the elastic element and mass element to cooperate in oscillation as a lumped constant system, i.e., with the elastic and mass elements concentrated in localized regions of the system. In a simple lumped constant species, elasticity may be contributed by an elastically virbratory mounting for a vibratory element having mass associated therewith, and the system tuned to a resonant frequency. The elastically vibratory member may also, as mentioned above, be of a distributed constant type, such for example as an elongated elastic bar, and may have such terminations, and be elastically vibrated at such a frequency, as to set up therein an elastic standing wave pattern. Morever, the frequency can in certain cases be adjusted to establish a resonant standing wave in the vibratory member. In some cases the earth engaging tip, tool or extremity, such as the point of a bar, or a moldboard plowshare, or a disk, may have an elastic standing wave, or a portion thereof, within itself.

A brief discussion of standing waves applicable to the present invention may here be useful. Assume, for example, a lateral elastic deformation wave in an extended elastic bar, with a source of lateral vibrations of one extremity of the bar, and the other extremity functioning as a soil engaging cultivator element. The lateral elastic deformation waves sent along the bar from the source end to the cultivator end are reflected from the latter and return toward the source end. The reflected waves interfere with the oncoming or forwardly travelling waves so as to reinforce one another at certain points and to counteract or nullify one another at other points, in accordance with known principles. At certain frequencies these points are relatively stationary in location, and the points of reinforcement are regions of maximum vibration amplitude called velocity antinodes, while the points of nullification are regions of minimized vibration amplitude called nodes (or pseudo nodes when there is some remaining amplitude). The phenomena of resonant standing waves thus depends upon wave reflection and wave reinforcement and interference.

The attainment of a favorable standing wave in the elastically vibratory cultivator tool involves, in addition to use of proper frequency for the physical geometry and dimensions of the vibratory apparatus, consideration of the attainable degree of acoustic coupling and the degree of impedance match between the vibratory system and the soil.

According to theory, maximum flow of sonic energy from the vibratory cultivator tool requires, in addition to perfect coupling engagement between the tool and the soil under a sustained bias pressure, an exact match of the output impedance of the tool to the acoustic impedance of the soil. Soil impedance has already been defined, and the output impedance of the tool is the ratio of oscillatory force amplitude to oscillatory velocity amplitude in the tool at its output or soil-coupling surface. Under idealized conditions of perfect impedance match and complete coupling, the entire sonic energy in the tool would be transmitted into the soil, no sonic wave would be reflected back, and therefore no standing wave would be obtained. In accordance with the invention, however, a substantial but not a 100% degree of acoustic coupling is provided, and the output impedance magnitude of the cultivator tool is adjusted toward or into the region of the soil impedance magnitude, so that a reasonably close approach toward or an approximation of an impedance match is provided. However, as arranged in accordance with the invention, the output impedance of the vibratory cultivator tool is set or left to some degree mis-matched with the soil impedance (as by being higher, or lower, or higher in one region and lower in another) and acoustic coupling is made or becomes less than theoretically possible, as, for example, by failure of the soil to sustain itself against applied bias pressure in some region of the coupling area. Thereby, a substantial reflected wave is available in the cultivator tool to cooperate with the advancing wave to create the desired standing wave therein.

In one advantageous practice of the invention, acoustic coupling effectiveness is decreased, and the standing wave thereby strengthened, by planning for and bringing about a degree of cavitation in the soil adjacent at least a portion of the vibratory acoustic coupling surface of the cultivator tool. This condition of cavitation, which will be referred to again hereinafter, contributes certain additional benefits to the process.

It is always of importance to the invention that the vibratory system have an output impedance which will both permit an effective degree of acoustic coupling to the tillable soil and result in substantial flow of sonic energy into the soil. This acoustic coupling need not and should not be perfect, for reasons given in the preceding paragraph. However, the coupling must involve a sufficiently good match of the output impedance of the sonic cultivator to the acoustic impedance of the soil, so that substantial sonic energy can be transmitted into the soil.

Certain principles of the invention can be appreciated by consideration of their operation in an illustrative embodiment of the invention wherein the elastically vibratory member or resonator comprises an elongated bar, one end portion of which engages into the soil to be cultivated to cultivation depth, and to the other end of which there is coupled an oscillator or generator of continuous elastic vibrations. The bar is mounted so as to be free for vibration in a predetermined standing wave pattern when the generator is operated in a particular frequency range. There are two possible cases, viz., a longitudinal standing wave, and a lateral standing wave. The following discussion applies to either. For the illustrative case, the bar is assumed to comprise a vibration transmission means of a distributed constant type, involving both elastic stiffness reactance $X_c$ and mass reactance $X_m$. The former, stiffness reactance, is equal to $1/2\pi fC$, where $f$ is frequency of vibration and C, compliance, is the ratio of the linear displacement of an elastic member to the force applied thereto. Mass reactance is equal to $2\pi fM$, where $f$ is again vibration frequency, and M is the effective mass of the elastically vibratory system. When the generator is driven at a certain critical frequency, such as to "resonate" the system, i.e., establish a resonant standing wave, the elastic stiffness is equal to and cancels or "tunes out" the force-wasting mass reactance $X_m$ owing to the masses of the generator and the vibration transmission bar. At this time, $X_c=X_m$, or $1/2\pi fC=2\pi fM$, and $f$, for resonance becomes $1/2\pi\sqrt{CM}$. Under this condition, the only opposition to vibration is the frictional resistance R within the vibratory system, in the soil being broken loose, disintegrated, fluidized and stirred or turned over. In symbolic terms, impedance $$Z \text{ (opposition to vibration)}=X_c-X_m+R$$

At resonance, this reduces to $Z=R$. Thus the vibration generator can attain good vibration amplitude and output power completely unhindered by the masses to be vibrated or the elastic stiffness of the system. A proper generator of moderate size and cyclic output force thus can easily vibrate the soil engaging tool, and the portion of the soil acoustically coupled thereto, with high cyclic acceleration, not withstanding the necessity for vibrating the otherwise force-consuming masses.

The vibration transmitting bar operating with a resonant standing wave therein contributes high "Q" to the vibratory sonic system, as well as facilitating vibration of the masses involved. The Q factor of vibratory systems will be understood to be a figure of merit analogous to flywheel effect in rotational systems, or sharpness of tuning in electronic systems. The vibration transmission bar is accordingly constructed, according to principles known in the art, to possess inherently a relatively high "Q" factor. This can be accomplished, for example, simply by designing it for massiveness and high elastic stiffness, or in other words low compliance (defined hereinabove).

Specifically, for high Q, the ratio $X_m/R$, which is the mathematical definition of Q, is made high. No value for Q is here stated, since the necessary Q will vary with the type of cultivator tool in hand, and there is no necessary critical value for this factor. Suffice it to say that, in the mechanical design of the system, the Q factor should be made as high as reasonably practicable, and those skilled in the art will understand how this may be accomplished.

As emphasized in the foregoing, the process of the invention requires an acoustic coupling of the system to the soil to be worked. One advantageous species of the invention provides for a graduated degree of acoustic coupling to the soil as the soil moves against the coupling surface of the vibrating cultivator tool, in a manner to accomplish a graduated degree of cavitation in one region of the coupling surface, as will presently be more fully described.

The first requirement in providing an acoustic coupling between a source of sonic vibrations and the soil is to provide a sonically elastically vibratory device driven by such source, and a soil penetrating tool with a vibratory acoustic wave radiation and coupling surface which is adapted for contact with the soil. In a particular illustrative embodiment of the invention, this vibratory tool surface slopes forwardly (in respect of the direction of progression of the tool through the soil) and downwardly, and a lateral standing wave is set up in the tool along the line of the slope. Illustratively, the sloping tool surface can be the front edge of a forwardly and downwardly sloping elastic bar which is elastically vibratory in a transverse mode of vibration. The sloping tool surface then vibrates normally to the line of the slope and with a component of motion in the direction of progression of the tool through the soil. This sloping tool surface is pressed against the submerged interface of the soil by moving slowly ahead with the vehicle which mounts the tool. By such means, the vibratory acoustic coupling surface is pressed against the underground soil interface with a very considerable bias pressure, and thereby effectively acoustically coupled to the soil.

For best overall acoustic coupling according to the invention, the vibratory acoustic coupling surface is biased against the submerged soil interface with so much pressure that the soil begins to fluidize acoustically, and to displace laterally in front of the coupling surface. Thus, at the sonic frequencies characteristic of the invention and at the vibration amplitudes attained, the soil disintegrates, becomes dynamically suspended, and flows almost like water. This is an important effect in the practice of the present invention. The described lateral displacement of the soil under the conditions described results under certain conditions in a degree of cavitation of the fluidized soil, which simply means a cyclic separation of the vibratory coupling surface from the submerged soil. This may occur locally where, under the prevailing forwarding bias pressure, the soil is incapable of elastic spring back in step with and to the extent of the vibratory amplitude of the coupling surface. This can occur because of any one of a variety of reasons. For example, at a shallow depth on the tool, the soil may be incapable of withstanding the vibrations plus the bias force, and will lack full elastic spring-back. Very near the surface, of course, the soil will simply crumble, with complete loss of coupling. Where the available bias force is substantial, but there is insufficient soil resistance or spring-back for it to be fully applied or sustained, the aforementioned condition of cavitation, or an incipient cavitation, can be developed. This means some loss of acoustic coupling, but fortuitously, an increased extent of soil fluidization and lateral flow, including a flow in the nature of an extrusion up the incline of the vibratory surface of the tool. Coupling is thus to that extent diminished, and the effect described might be thought to be disadvantageous, excepting for the discovery that cavitation has the advantageous result of further promoting fluidization and mobility of the soil, which is the wanted condition. Cavitation also desirably reduces friction of the soil particles on one another. Limited cavitation in a region of the coupling surface, while not indispensible to the broad invention, is nevertheless, accordingly, an important feature of the invention in one of its preferred forms.

The coupling surface is commonly, or in one preferred form of the invention, on a soil penetrating tool which vibrates with a lateral standing wave pattern, with the lower extremity of the coupling surface in coincidence with a velocity antinode of the wave pattern, i.e., with a region of the wave pattern where vibration amplitude is maximized. Here, the bias and vibration amplitude may be sufficient to bring about a large degree of acoustic coupling. Sonic activation, fluidization of the soil, and lateral movement thereof, are thereby accomplished. Since the amplitude can be a maximum at a bottom antinode, the bias, even though large, may in some soils be insufficient to maintain coupling, and cavitation will sometimes occur here. Higher up on the tool, somewhat above the velocity antinode, the vibration amplitude is somewhat less, and the bias pressure which can be imposed and sustained is likely to be much less. Cavitation, to a limited extent, may then occur in this region because of relatively greater drop in bias. The soil agitation and mobility are thereby materially heightened, and the soil tends to flow upwards along the vibratory tool surface towards or to the node. If or where cavitation becomes too complete, dominant, or exclusive, on the other hand, such as by insufficient bias force, acoustic coupling is undesirably reduced, or even lost, and performance may suffer accordingly.

In the process described, the progression of the soil up or longitudinally along the vibratory coupling surface depends somewhat upon the nature of the soil being tilled, and with clayey type soils, is often a form of extrusion.

The preferred process thus involves the use of a graduated degree of acoustic coupling of the vibratory tool surface with the soil, with the lowermost region of the tool surface typically in firmest engagement with the soil as the complete farming implement is propelled forward, and with lesser and lesser coupling to the soil in the direction of the ground surface. The soil sliding up the sloping coupling surface is thus in lesser and lesser acoustic coupling relation to said surface as it slides up the surface. This condition is in part owing to progressively lessening resistance of the soil to the bias and to tool vibration amplitude upwards along the tool, and in part to the sloping orientation of the coupling on the tool. At some point or region up the tool, the desirable condition of cavitation, or partial or beginning cavitation, is preferably established. This can often be controlled by regulation of the cyclic force or power with which the oscillator is driven. When a degree of cavitation is thus obtained, soil mobility is increased, as previously mentioned.

It should also be noted that the impedance of the cultivator tool is least at the bottom antinode, and progressively increases in the upward direction to the node. Thus, the impedance match to the soil is graduated along the coupling surface. In case of relatively deep cultivation, and with many agricultural soils, of which hard pan is an extreme example, the minimum impedance of the tool, at the bottom antinode, can be lower than soil impedance. Higher up on the tool, within a small region, the impedances may then be almost exactly matched; and still higher on the tool, approaching the node, the impedance of the tool exceeds that of the soil in a gradually increasing manner. In softer, loamy type soils, the impedance of the tool may everywhere be greater than that of the soil. In all cases, however, the tool has an output impedance sufficiently matched to soil impedance for good radiation of sonic energy into the soil.

The portion of the vibratory or acoustic wave radiation surface of the vibration tool which remains in good coupling engagement with the soil, i.e., particularly the lower extremity thereof, acts to radiate acoustic waves or vibrations into and through the soil, such that the soil being stirred and turned is subjected to a strong sonic wave field, i.e., one of high sonic energy density. This high energy density causes the soil to be violently worked and fractured into small particles very early in the sonic application process.

As these fractured particles are tilled upward the sonic action causes considerable tumbling of these irregularly shaped particles.

The continued sonic action working on these irregular-shaped particles, having a large range of individual acoustic impedances, results in enhanced tumbling, mixing, and fracturing, with resulting general "loamy" characteristics. Then as this sonically treated mass moves up to its final tilled location it is subjected to considerable sonic cavitation at the higher portion of the tool, where considerable aeration and porosity is created.

The sloping vibratory soil engaging surface of the tool can be on a uniform incline, or, in another embodiment of the invention, can have a complex curvature, such as is characteristic of a common plowshare. For example, the lower end of the elastically vibratory bar can mount a plowshare. With complex curvatures such as are characteristic of plowshares, the graduated degree of acoustic coupling can be accomplished with either a lateral or a longitudinal mode of vibration in the elastic vibratory system associated with the curved surface.

It is important to note that this invention includes three adjustable variables having mutual interrelation. These variables are the orientation of the radiating surface, the direction and amount of the bias force, and the direction and power of the oscillatory path of the radiating surface. In all instances the oscillatory path has a vector component which is normal to the radiating surface. The bias force has in most instances a vector also normal to the radiating surface. However, it is important to note, such as with the plowshare form, that the very most extreme region of the leading point can be almost parallel to the bias force. The orientation of the elastic vibration pattern remains such, for this case, that there is a vector component of oscillation normal to the radiating surface. This latter condition is a requirement that is common to all forms of the invention.

Referring further to the plowshare form, and assuming the lateral mode of vibration in the elastic bar that mounts the plowshare, it is to be noted that the extreme penetrating tip of the plowshare can be made to experience a moderate degree of cavitation, because this tip or leading portion of the radiating surface may be so formed that the bias force is almost parallel to it. The area of the radiating surface at the tip that is normal to the biasing force is therefore relatively small. This condition obviously prevents very substantial bias force application at the penetrating tip of the plowshare. Acoustic coupling is thereby reduced. The plowshare may be generally conclavely curved in the vertical direction, somewhat in the usual fashion, so that the lower edge portion of its forward face makes a somewhat obtuse angle with the direction of bias application. This also reduces coupling in that region, and tends toward cavitation, for similar reasons. In this case, therefore, I provide a vibratory radiation device which starts out with a moderate degree of acoustic coupling, increasing to a substantial degree of coupling some distance up the conclavely curved coupling surface, and then decreasing again as the soil releases itself from the final contact region. The underground cavitation phenomena is peculiarly beneficial in tillable soils where there is no need for high energy concentration to cause soil fracturing or dust generation at the leading edge of the tool.

Assume now, as a further example, a downwardly and forwardly sloping elastic bar, mounting a plowshare at its lower end, generally as in the preceding example, but with the elastically vibratory action now taking place in a direction longitudinally of the bar, instead of transversely thereof. In this case the tip region of the plowshare can again be so formed that the horizontal bias force will be nearly parallel therewith. In this case, the bias force, which is again derived from the forward travel of the tractor vehicle, is again horizontal. The longitudinal standing wave in the bar produces a component of horizontal vibration, and a component of vertical vibration. The component of horizontal vibration is in the direction of the bias force, and is most effective, therefore, to radiate acoustically into the soil. At the tip of the plowshare, coupling can be very small by reason of the near parallelism of the tip of the principal direction of the bias force. Cavitation or incipient cavitation, can thus be realized at the tip with some soils or soil conditions. The same, but to a lesser extent, can be true along the lower edge region of the plowshare, for reasons heretofore explained.

Above any such tip or lower edge region (where cavitation may sometimes be realized) the plowshare has concavely curved surface area which becomes progressively less parallel with and more nearly normal to the direction of bias application. Acoustic coupling to the soil thus improves on the surface of the plowshare from its lowermost edge upwards. Coupling may maximize at a level where the angle of the plowshare surface results in a favorable bias application to the soil, and where there is also a good component of vibration in a direction normal to said surface. Coupling tends to deteriorate as the ground surface level is more closely approached, and bias force cannot be sustained by earth pressure so that cavitation may again occur.

In the case of a disk harrow or plow type of tool, the angle of the axle member can be such that the leading portion of the curved disk cuts into the soil in a slicing manner. In this case, I may provide for a lateral wave in the axle member, so that the disk rocks primarily sideways in its oscillation path. The acoustic radiation is thus in primarily a lateral direction (relative to forward travel of the tractor), and acoustic coupling is fairly moderate, down in the cavitation level of coupling. Because of the curvature of the disk this acoustic coupling can reach a fairly high degree as the soil slides around the curve and builds up pressure some distance along its path over the surface of the disk.

A further improvement in accordance with the invention is the injection of a stream of pressurized fluid into the soil where and while the soil is being subject to sonic vibratory treatment. This fluid injection treatment may serve any or all of a number of useful functions, including aeration of the broken soil, introduction of fertilizer, general soil conditioning or rebuilding, or, in a non-agricultural case, the injection of soil hardening chemicals, as to provide a landing field or car parking area.

In all cases, the soil penetrating tilling element, whether bar, plowshare or disk, is shaped and arranged for continuous release and redeposit of the tilled soil, substantially in situ.

In the drawings:

FIG. 1 is a perspective view of one illustrative embodiment of the invention;

FIG. 2 is a fragmentary view of a portion of FIG. 1, showing the lower end portion of a vibratory bar thereof in operative engagement with the soil;

FIG. 3 is a view showing the lower end portion of a vibratory bar of the apparatus of FIG. 1 and showing imposed thereon a standing wave diagram;

FIG. 4 is a longitudinal sectional view through a vibration generator and an upper end portion of one of the vibratory bars of the apparatus of FIG. 1, being a view taken on broken line 4—4 of FIG. 5;

FIG. 5 is a view taken on broken section line 5—5 of FIG. 4;

FIG. 6 is a side elevational view of a plow in accordance with the invention, showing also, framentarily, the rear end portion of a tractor vehicle;

FIG. 7 is a plan view of the plow of FIG. 6, with certain parts broken away;

FIG. 8 is a view taken in accordance with line 8—8 of FIG. 6;

FIG. 9 is a side elevational view of a plowshare and vibratory supporting shank therefor, together with associated parts, being an enlargement of a portion of FIG. 6, with certain parts broken away;

FIG. 10 is a section taken on line 10—10 of FIG. 9;

FIG. 11 is a view taken in accordance with the line 11—11 of FIG. 9;

FIG. 12 is a view, with parts broken away, taken in accordance with the section line 12—12 of FIG. 9;

FIG. 13 is a longitudinal section, to an enlarged scale, taken through a vibration generator of the embodiment of FIGS. 5–12;

FIG. 14 is a section taken on line 14—14 of FIG. 13;

FIG. 15 is a section taken on line 15—15 of FIG. 13;

FIG. 16 is a view partly in elevation and partly in section, viewing the vibration generator of FIG. 13 from the left as seen in FIG. 13;

FIG. 17 is an elevational view, with parts broken away, showing a modified form of plow in accordance with the invention;

FIG. 18 is a view looking toward the apparatus of FIG. 17 from the left as seen in FIG. 17;

FIG. 19 is a section taken in accordance with the line 19—19 of FIG. 17;

FIG. 19a is a detail section taken on line 19a—19a of FIG. 17;

FIG. 20 is a plan view of a disk type plow or harrow in accordance with the invention;

FIG. 21 is a side elevational view of the plow of FIG. 20;

FIG. 22 is a plan view, to an enlarged scale, of the rearward end portion of the plow of FIG. 20;

FIG. 23 is a view taken in accordance with line 23—23 of FIG. 20; and

FIG. 24 is a section taken on line 24—24 of FIG. 23.

FIGS. 1–5 show a simple illustrative embodiment of the invention. A two-wheeled vehicle 50 has a heavy platform 51 which includes a rearward portion 52 mounting a pair of relatively heavy, elastic, cultivator bars 53 fabricated of steel, and a forward portion 54 coupled as at 55 to the drag element 56 of a tractor vehicle, not shown. It will be understood that the element 56 may be adjusted vertically to accomplish the necessary tilt of platform 51 on its two wheels for proper engagement of the bars 53 with the earth, or to elevate the bars 53 sufficiently for road clearance during towing when not in service.

The bars 53 are preferably of rectangular cross-section, with their wide sides parallel to the direction of vehicle travel for good elastic stiffness in this direction, and are arranged and driven to vibrate in a standing wave pattern, e.g., in the lateral standing wave pattern $w$ illustrated in FIGS. 1 and 3. To this end, the bars 53 are mounted at or near their mid-points in fittings 58 secured to platform 51; and they are mounted in forwardly and downwardly slanting or inclined positions, as shown. The forward lower extremities of the bars are preferably bevelled, as indicated at 60.

The rearward, upward ends of the bars 53 carry vibration generators or oscillators 62, capable of generating continuous sonic vibrations or waves and applying same to the ends of the bars. Details of an illustrative generator are shown in FIGS. 4 and 5.

Referring to FIGS. 4 and 5, each vibration generator 62 embodies a cylindrical casing 64, which snugly receives a generator body 70 having a circular headwall 71 at the top and a circular bottom wall 71a at the bottom, the peripheries of these walls being sealed to casing 64 as by O-ring seals 63, as shown. Body 70 extends the full width of the casing 64 as seen in FIG. 4, but in the aspect of FIG. 5 is narrowed to form a bridge-like intermediate wall 72, affording air chambers 73 on each side thereof as shown.

Bridge wall 72 is formed with a pair of horizontally spaced bores 82, and side plates 83, secured to wall 72 as by screws 84, have cylindrical plugs 85 extending into bores 82 and pressure sealed therein as by means of O-ring seals, as shown. The inner ends of the opposed plugs 85 are spaced, as shown, and disposed in the bores 82 with a close fit between the plugs 85 are hardened steel race rings 87. The cylindric chamber 90 inside each race ring 87 contains a hardened steel cylindrical inertia rotor 91, of a diameter preferably somewhat greater than the radius of the inner diameter of ring 87, and a slightly less width than the distance between opposed plugs 85. The diameter of the rotors, the relative diameters of the rotors and inner circles of the race ring, and also the thickness of the rotors, are all germane to the cyclic force impulse that will be delivered to the bar 53, and that is available at the output or cultivator end of the bar; and for an appropriate output impedance at the output or soil-coupling end of the bar, i.e., for a proper degree of impedance match to the soil, may be in the general proportions in relation to one another and to the bar, inclusive of the generator body 70, as here illustrated. A plurality of air channels or grooves 92 are cut in opposite sides of each of rings 87, and these are directed tangentially to the chambers 90. These grooves act as air nozzles, introducing air under pressure to chambers 90 in tangential directions in a manner to drive rotors 91 orbitally about the inner periphery of rings 87. It will be observed that the grooves 92 in the two race rings 87 appearing in FIG. 4 are cut in similar tangential directions, so that the directions of air spin in the two chambers 90, and therefore the directions of orbital travel of the rotors 91 will be in the same direction. It is to be understood that the grooves 92 cut in the faces of race rings 87 on the back sides of said rings as seen in FIG. 4 will also be such as to introduce air tangentially with the same spin direction caused by the air in the grooves 92 in the front sides of the rings. Thus the rotors 91 are driven in the same orbital directions from all sources of pressure air.

The outer ends of nozzle grooves 92 are in communication with channels 95 formed in walls 72 around plugs 85. Pressure air is introduced to channels 95 via bores 96 extending upwardly therefrom through the upper end of body 70 to the space 97 immediately thereabove. This space 97 is enclosed by means of a generator cover 65 screwthreaded to the upper end of the cylindric casing wall 64, as indicated at 65a. Air under pressure is fed to the space 97 via an air conduit 98 coupled as at 99 into generator cover 65. This pressure air, thus introduced into the generator cover space 97, flows by way of bores 66 to the channels 95, and thence via the nozzle grooves 92 into rotor chambers 90, driving the rotors 91 as already described. Spent air leaves chambers 90 through ports 90a located centrally in members 83, 85. This air thus passes to chambers 73, and thence flows through a transverse passage 100 in the bottom portion of wall 72 to a vertical passage 101 formed in a tubular stem 102 extending downwardly from body 70.

Stem 102 is tightly mounted in the upper end of a corresponding bar 53, being received in a tubular socket 103 and screw-threaded tightly to the bar 53 as by the screw threads indicated at 104. The stem 102 is screwed into the threads at 104 until the upper extremity of bar 53 is in tight engagement with generator body 70 (see FIG. 4). The tubular socket 103 continues below stem 102 as a bore 105 extending longitudinally in the bar 53, and it is a preferred feature of the invention that this bore 105 extend longitudinally of the bar 53 to a discharge orifice 106 located in the earth-engaging coupling face area of the bar, in the region of the opposite extremity thereof, where it can contribute its effect in loosening, fluidizing, turning and aerating the soil.

As described above, the nozzle grooves 92 are so directed as to introduce pressure air into chambers 90 with like directions of spin. The jets of air issuing from grooves 92 spin circularly about the chambers 90, impinging on the rotors 91, drive them in corresponding directions at a relatively high spin frequency in orbital paths guided by the inner surfaces of race rings 87. The pressure fluid introduced into the two inertia rotor chambers 90 causes orbital motion of the two inertia rotors 91, each of which exerts a centrifugal force on its corresponding race ring 87. The rotating force vectors so exerted on the race rings are of course transmitted to the body 70, and thence to the longitudinal bars 53. The rotors 91 are automatically synchronized to operate in phase with one another. Synchronization results from the rotors being connected through the generator body 70 with the elastic vibratory bar 53, vibrated at a lateral resonant frequency of the bar. When the inertia rotors are driven by the pressure fluid at a spin frequency approaching or approximating the resonant frequency of the bar 53 for a mode of lateral resonant standing wave vibration, the bar, as a result of some initial force impact received from the generator, is started into its lateral mode of standing wave vibration. The generator body on the end of the bar 53 is then strongly constrained to undergo lateral vibration at the standing wave frequency of the bar 53. As a result the rotors 91 begin to synchronize automatically, moving with their horizontal components of travel always in step with one another. As the rotors thus come into better and better phase correspondence, the standing wave in the bar 53 becomes stronger and stronger. The process builds up until bar 53 vibrates at its maximum amplitude (for the amount of power input) and rotors 91 are perfectly synchronized.

Thus, under the described conditions of resonant synchronism, the vibration generator 62 applies to the rearward end of the bar 53 an alternating force directed laterally thereof, and is regulated to do so at the frequency for fundamental resonant lateral standing wave vibration of the bar. It is of course necessary that the air pressure delivered to the vibration generator be regulated to be such as will drive the inertia rotors 91 at a spin frequency approximating such frequency. When this has been accomplished, the rotors 91 "lock in" at the resonant frequency in synchronism with one another.

The fundamental resonant lateral standing wave pattern set up in the bars 53 is represented at w in FIGS. 1 and 3, and will be seen to be of substantially one and one-half wavelengths long, with three-quarters of a wavelength on each side of the substantially fixed bar mounting 58. Velocity antinodes V (regions of large vibration amplitude), occur at the extremities of the bar, and at points spaced one wavelength inward from the extremities; while velocity nodes N (regions of minimized vibration amplitude) occur at the mid-point or mounting region of the bar, and at points spaced one-quarter wavelength from the ends of the bar. The antinode at the generator 62 may be reduced in amplitude owing to the lumped mass loading effect of the generator itself. It will be understood that harmonic frequency lateral wave patterns may also be used, either with or without the fundamental.

It will be understood that the lateral standing wave pattern is a product of an advancing lateral wave of elastic deformation propagating down the length of the bar from the generator end to the earth engaging end thereof, and a reflected return wave of elastic deformation. At the frequency for standing wave resonance, the advancing and reflected waves interfere with one another, largely cancelling one another at the nodes, and reinforcing one another at the antinodes. The waves are in the nature of waves of elastic deformation, and can be called elastic standing waves. It will be seen that they depend upon reflection, and their pattern is weakened as energy is drawn from the bar rather than reflected. To operate properly, some energy must be drawn off to work the soil, and some returned up the bar as a reflected wave to maintain the standing wave that gives the system its character and governs its performance.

The generators as described will also deliver cyclic force pulse components longitudinally of the bars. However, the resonant frequency for the lateral vibration mode ordinarily differs from the resonant frequency for the longitudinal mode, so that lateral vibration of the bar is amplified by resonance, giving substantial lateral motion, while the frequency range for longitudinal resonance is unapproached, and longitudinal vibration is therefore minimal and can be neglected for this case. However, longitudinal vibration can be usefully employed in certain configurations of cultivator tool, and a degree of longitudinal vibration in the form of FIGS. 1–5 can be beneficial in cutting down and ahead into the soil.

In service, the vehicle 50 is towed slowly forward by the unillustrated tractor vehicle, with adjustments made for desired ground engagement and penetration by the lower end portions of the slanting and bevelled bars 53. The depths of penetration may be varied as desired, depending upon soil constitution and other factors, and are usually comparable to the depths of plowing or cultivation which are common in conventional farm practices with conventional tools. Greater or lesser depths than are commonly used, however, may be employed in the practice of the invention. A greater depth range is made possible, partly by the sturdiness of the apparatus, but more importantly by the sonic vibratory action, which facilitates penetration of the bars, loosening of the soil, fluidizing it, and raising and turning it over. In operation, the edge 53a at the tip of the bar cuts into the soil to break loose the portion that is to be tilled. An adjacent acoustic wave radiating and coupling surface area 53b on the front edge of the soil penetrating portion of the bar presses against the soil ahead.

The earth working action of such vibratory bars as the bars 53 has been fully described in the introductory part of the specification, and will be only briefly repeated at this point.

The forwardly facing surface 53b of the sloping bar 53, by reason of the forward progression through the soil, exerts a steady "bias" pressure against the soil. This bias pressure is evidently exerted primarily in a horizontal direction, i.e., in the direction of progression through the soil, but a vector component of this bias pressure is exerted in a direction normal to the sloping forward face of the bar. The sloping forward face of the bar vibrates laterally, according to the elastic standing wave pattern described, and as represented by the double-headed arrow d in FIG. 2, and the direction of this vibration is thus laterally of, i.e., normal to, the length of the sloping bar. A component of this vibration is, however, exerted in the principal direction of bias application, or in other words, horizontally. Thus the maximum bias pressure is horizontal, with a component normal to the bar; and the maximum vibration is normal to the bar, with a component in the horizontal direction, parallel with principle bias pressure direction. In the region where the bias pressure can be maintained, i.e., where there is sufficient soil resistance, and the soil does not crumble, the forward surface of the bar becomes acoustically coupled to the soil in a substantial degree, and accordingly radiates substantial amounts of sonic wave energy into the soil. This region of acoustic coupling to the soil can vary in degree as well as in relative area and location, with various factors such as soil constituency, bias pressure, and orientation of the soil engaging surface of the bar, but will generally, with the straight sloping bar characteristic of the species of FIG. 1–5, begin at the lowermost extremity of the bar and extend for a matter of a few inches up the bar. Such an area, of substantial acoustic coupling to the soil, is somewhat arbitrarily designated at a in FIG. 2, and will be understood to apply to a given representative soil. As there illustrated, within this area a of assumed good or substantial acoustic coupling, the vibrating bar is pressed firmly against the firmly resisting region s of the soil under cultivation. In considering FIG. 2, it must be realized that the bar is undergoing lateral standing wave vibration, according to the wave pattern represented in FIGS. 1 and 3, and by the double-headed arrow d in FIG. 2, with a vibration amplitude at the tip of the bar which may be of the order of .050″. Within the acoustically well coupled region a, where the bias pressure is well sustained, the soil may vibrate elastically with the coupling surface of the bar, without the occurrence of material separation at the interface. Wave reflection is reduced in this area of good acoustic coupling, and good radiation of sonic energy is correspondingly attained. Enough wave reflection is obtained, however, from the underside of the bevelled end of the bar, where there is practically no acoustic soil coupling, and from the area of the front face of the bar immediately above the region a, and even in some cases within the area a (where occasionally, or with some soils, some cavitation may occur), to assure a good standing wave pattern. In the bar region just above region a, soil resistance is assumed to be reduced, and sustainable bias pressure is therefore correspondingly reduced. This means reduction in or failure of acoustic coupling. The coupling surface of the bar then separates somewhat from the soil during the return stroke of the cycle of bar vibration, and a condition of moderate cavitation prevails, wherein the soil does not elastically spring back well enough to maintain good acoustic coupling with the bar.

Within the coupled region a, a layer of soil in front of the coupling surface on the bar, under the influence of the radiated sonic vibration, and of the sonic vibration of the immediately adjacent acoustically coupling surface, becomes mobile, tends to fluidize, and displaces laterally in front of the coupling surface, tending particularly to slide or extrude up the coupling surface. In the region c of cavitation, there is an increased fluidization and flow of the soil, and the soil, if not already disintegrated within the sonic coupling region a, is then disintegrated into small particles, which move relatively to one another, according to their motivations, particle sizes, and/or impedances. The soil is thereby vigorously agitated, loosened, turned, and softened, as well as aerated and heated. These effects can take place either within or just forwardly of the region a of substantial acoustic coupling, or within the cavitation region c, or both, to varying extents according to local soil constituency and condition. Usually, these effects will be augmented in the presence of cavitation. In practice, there will ordinarily be no sharply defined division point between the region a of substantial acoustic coupling and the region c of lesser coupling but substantial cavitation. Instead, the reduction of coupling up the bar and the onset of cavitation tend to be progressive, coupling being gradually reduced as cavitation is first incipient and then progressively enlarges. The integrated effect is a breaking up of the soil, in an in situ loosening, fluidizing, lifting, and turning thereof, together with further desired effects such as aerating and heating. These matters were amply discussed in the introductory portion of the specification, and need not here be further elaborated.

The matter of impedance match between the coupling surface of the bar and the soil is of interest, and any one of several conditions may prevail. Assuming a long bar 53, penetrating deeply into the soil, and considerable soil compaction, or hard pan or the like at the level reached by the extremity of the bar, the soil impedance may exceed the impedance of the bar at the lower extremity (antinode) of the latter. This will of course depend in any given case upon bar geometry and size, the force and power with which it is driven, and the composition of the soil. Assuming the soil impedance to exceed bar impedance at the velocity antinode, or lower extremity, of the bar, the impedance match will then gradually become closer and closer in the direction up the bar. This is both for the reason that bar impedance inherently increases in the direction away from the antinode and toward the node, and for the additional reason that soil impedance tends tto fall off the closer the ground surface is approached. The last mentioned effect can be due to any one or all of several causes, such as greater soil softness near the surface, lack of sufficient soil resistance to withstand bias pressure application near the surface, greater sustained bias pressure at depth, and improving soil softness as the soil is loosened from its initial position, subjected to the sonic treatment, and elevated and turned over. Thus, at some point up on the bar from the extremity, bar impedance may closely match soil impedance. Above this point on the bar, the bar impedance will then of course exceed soil impedance. With lesser depth of cultivation, or softer or more loamy soils, or both, the impedance of the bar may everywhere exceed the impedance of the soil, the degree of impedance match decreasing progressively up the bar from its lower extremity. As earlier stated, however, the bar impedance must in all cases be sufficiently close to soil impedance for assurance of reasonably good acoustic coupling to the soil and therefore reasonable sonic energy flow from the bar into the soil. It will be within the ability of those versed in the art of acoustics, directed by the present teaching, to provide the required output impedance at the extremity of the bar, such as to fall within the desirable areas of impedance match to the soil discussed hereinabove. A vibration generator and bar in the approximate relative proportions shown in FIGS. 1–5 will provide a suitable output impedance characteristic to drive the elastically vibratory bar when sonically coupled to the soil, as is essential. In this connection, the scale of the generator and bar equipment has little or no relation to the output impedance, which is a function of the ratio of oscillating force to oscillating velocity at the coupling end of the bar. Therefore, the apparatus may be built to different scale without material modification of output impedance. The change of bar frequency with change in scale is not a large factor. It is thus evident, insofar as output impedance is concerned, that there is no critical size or scale for the apparatus of FIGS. 1–5.

It will also be seen to follow from the discussion of the preceding paragraph that, particularly with soils of initial relatively high acoustic impedance, the process of the invention results in a reduction in the acoustic impedance of the soil. And it will be clear that a soil of low acoustic impedance is highly superior for agricultural purposes to a soil of relatively low acoustic impedance.

Reference is next directed to FIGS. 6–12, showing a modern moldboard plow equipped with improvements in accordance with the present invention. Many details of the plow may be conventional, and need not be illustrated or described minutely. The plow, designated generally at 120, has a frame 121 provided with a suitable hitch 122 to a partially illustrated tractor vehicle T whose rear wheels are designated in FIG. 6 at 124. The ground surface is represented at 125, penetrated by two conventional plowshares 126 equipped with usual mold boards 127. The plowshares 126 are secured to frogs 128 (FIG. 12), and to the latter are secured landsides 129, which are in turn secured to the lower ends of shanks or bars 130 made of good elastic material such as steel. The forward extremities or tips of the plowshares are preferably shaped to converge to a point at a sharp angle as shown best in FIG. 12, so as to have nearly parallel sides at the tip region. The plowshares are also generally concavely curved from the tip and the front lower cutting edge 126a upwardly, and the moldboards 127 are twisted somewhat in the conventional manner, as shown in the drawings. The elastic shanks or bars 130 extend downwardly and forwardly to the plowshares on an angle which, in the typical example of FIGS. 6 to 12, is something of the order of 45°, though this angle is not at all critical. The shanks are preferably in the general form of flat, longitudinally extended plates, of rectangular cross section, with their side surfaces in vertical planes, longitudinal of the plow, so as to have substantial elastic stiffness against lateral bending in the vertical plane.

In the simple plow here shown, there are two plowshares 126, one ahead of the other, and laterally spaced from one another, in usual fashion.

The particular frame here shown includes two generally longitudinal steel frame bars or straps 131 and 132, the former having a rearward main or rearward longitudinal portion 131a, a transverse portion 131b, and a short forwardly or longitudinally extending portion 131c, and the latter including a short rearward portion 132a adjacent to and spaced somewhat from the rearward extremity of bar portion 131a, a diagonal portion 132b extending transversely across the width of the frame from portion 132a, and a portion 132c which reaches forwardly from portion 132b and lies against frame portion 131c.

A spacer plate 133, of the thickness of shank 130, is placed between frame bar portions 131a and 132a, being positioned to leave a slot 133a between the rearward extremities of members 131a and 132a (FIG. 7), and two generally triangular mounting plates 134 and 135 are placed against the outer surfaces of members 131a and 132a. Bolts 136 hold the members 131a, 132a, 134 and 135 in assembly.

Somewhat similarly, two generally triangular mounting plates 138 and 139, exactly like the plates 134 and 135, are mounted in spaced relation to one another on the rearward part of the frame portion 132c, the plate 139 engaging the latter. These plates are spaced from one another by a spacer plate 140 at a distance equal to the thickness of a plow shank 130, and the assembly is secured by bolts 141. The spacer plate 140 is positioned to afford a slot 142 between the rearward portions of the plates 138 and 139.

The mounting plates 138 and 139 have downwardly and rearwardly projecting ears 144 which receive between them the mid-portion of the forward plow shank 130, the plow shank being mounted to the plates 138 and 139 by a pin 145 passing through ears 144 and the shank 130. A yieldable rubber bumper element 147 is placed and fastened in slot 142, and is shaped to engage two steps or abutments 148 and 149 on shank 130, so as to yieldingly oppose, and limit, pivotal movement of the shank 130 on its mounting pin 145.

Generally similar arrangements are made for mounting the rearward plow shank 130 to the mounting plates 134 and 135.

The upper ends of plow shanks 130 are formed with T-heads 150 which mount oscillators or vibration generators 152, driven through shafts 153 containing universal joints 154 from hydraulic motors 155 mounted on platform structures 156 supported by the pairs of mounting plates 134, 135, or 138, 139, as the case may be. The oscillator 152 and hydraulic motor 155 are preferably connected by brace plates or straps 157. The hydraulic motors are provided with pressure fluid supply and return lines 158 and 159, leading, respectively, from a suitable source of pressure fluid, and a receiver, not shown, but understood to be located on the tractor vehicle T.

The plow is completed by suitably mounted coulters 160 and 161, a rear wheel 162, and other usual appurtenances, not necessary to describe herein.

FIGS. 13 to 16 show the oscillator 152 of the plow of FIGS. 7–12 in a suitable and presently preferred embodiment. The oscillator has a housing 170 made up of an intermediate body member or block 171 and two end caps 172 and 173, together with a spacer member 174 between block 171 and cap 173, said members being of rectangular shape as seen in the aspects of FIGS. 15 and 16. The members 171 to 174 are secured in assembly with one another by machine screws 172a. A bore 175 extends through body block 171 and is continued a short distance into end cap 172 and spacer 174, as best seen in FIG. 13. Mounted in this bore 175 is a hardened steel raceway cylinder 176, in which is a cylindrical raceway bore 177. Washers 178 are preferably used in end cap 172 and spacer 174 at the ends of the cylinder 176. The cylinder 176 and the washers 178 thus define a cylindrical raceway for a hardened steel cylindrical inertia roller 180, which is of somewhat smaller diameter than the internal diameter of bore 177, and is adapted to roll around the inside of the bearing surface defining said bore 177.

Inertia roller 180 has an axial bore 181 which rotatably receives an axle 182 projecting axially from a spur gear 184. The pitch circle of gear 184 corresponds to the diameter of inertia roller 180, and this gear 184 meshes with a stationary internal gear 186 which is formed in the aforementioned spacer member 174. The internal gear 186 has a pitch circle coinciding with raceway bore 177.

Projecting from spur gear 184 is a cup 188 in which is formed an internal gear 189, and this internal gear 189 meshes with a spur gear 190 on the end of a driveshaft 191 which is journalled in the hub 192 of end cap 173 coaxially with raceway 177.

The inertia roller 180 will be understood to fit closely but with working clearance within the overlapping portions of the washers 178. In operation, inertia roller 180 rolls around raceway bearing surface 177, and is held in contact therewith by centrifugal force. While the oscillator is at rest, on coming up to speed, the roller 180 is maintained in close adjacency to bearing surface 177 by means of interengaging conical axial projections 194 and 195 on the gears 184 and 190, respectively, as clearly shown in FIG. 13.

Operation is as follows. Rotation of shaft 153 turns spur gear 190, which, being in engagement with internal gear 189 on one side, causes rotation of the latter. The gear 184 integral with the thus-driven gear 189 is in mesh with internal gear 186, and when driven, rolls around the inside of gear 186. Inertia roller 180 is thereby caused to roll around the inside of cylindrical bearing surface 177. As mentioned earlier, when the generator is up to speed, centrifugal force developed by the rotation of the roller 180 causes it to bear with considerable pressure against the bearing surface 177, and a substantial non-slipping, rolling engagement is thereby attained. As will appear, the roller 180 rolls around the inside of cylindrical bearing surface 177 substantially in step with the rolling of the spur gear 184 around the internal gear 186. Any tendency for roller 180 to describe this orbital path with a different rate of rotation on its axis from the rotation of spur gear 184 on the axis of the latter is accommodated by a slight rotation of roller 180 on the axle member 182.

The centrifugal force developed by the relatively heavy inertia roller 180 rolling in its orbital path around the inside of bearing or race ring 176 results in exertion of a substantial gyratory force on the oscillator housing 170. This gyratory force is transmitted from the oscillator housing to the upper end of the plow shank 130, through which the generator housing is secured by machine screws 197.

A gyratory force is thus applied to the upper end of the shank 130 which mounts the plowshare 126 at its lower end. As will be clear, a component of this gyratory force is oriented longitudinally of the long axis of the shank 130, and another component thereof is oriented laterally of the shank. The shank 130 will be recalled to be mounted at about its midpoint on a fixed mounting pin 145, so that the bar 130 is substantially fixed at its midpoint, but capable of a degree of elastic elongation and contraction in its two half-portions above and below the mounting pin 145. The bar 130 is also, of course, capable of elastic lateral bending action.

In accordance with a first preferred mode of operation, the vibration generator or oscillator 152 is driven by its hydraulic motor 155 at a number of revolutions per second equal to the fundamental longitudinal standing wave frequency for a so-called free-free bar, so as to provide a half-wavelength standing wave pattern such as represented in FIGS. 6 and 9 by the standing wave diagrams $sl$ shown therein. The critical frequency for a longitudinal half-wave standing wave is equal to $S/2L$ where S is the speed of sound in the material of the bar and L is the length thereof. When undergoing such a half-wavelength longitudinal standing wave, the upper and lower half portions of the bar alternately elastically elongate and contract at the frequency of the oscillator. With a bar length of something of the order of six feet, for example, the resonant frequency will be something over 1000 cycles per second.

The plowshare on the lower extremity of the bar 130 is accordingly vibrated at a frequency of the general order of, typically, a little better than 1000 cycles per second, more or less. The amplitude of such vibration of the plowshare may easily be of the order of 0.050 inch.

The generator 152 as here described for illustrative purposes applies to the upper extremity of the bar 130 not only an oscillating force oriented longitudinally of the bar, but also an oscillating force oriented laterally of the bar. However, the resonant frequency for lateral standing wave operation will in general be substantially different from that for resonant longitudinal standing wave operation, so that at the frequency for the longitudinal resonant standing wave, no resonant phenomena occurs insofar as lateral vibration is concerned. Under these circumstances, some lateral vibration does take place in the bar, but is minimal and can be neglected. If desired, of course, oscillators can be used on the end of the bar 30 which will create only an alternating force longitudinally of the bar, and no lateral vibration will in that event be produced; or, vice versa. An instance of such a generator which avoids the production of lateral components of vibration is the generator 50 of FIGS. 7 to 9 disclosed in my Patent No. 3,030,715.

In the event that it should be desired to operate the plow with a lateral standing wave, such as used in the embodiment of FIGS. 1 to 3, the oscillator 162 is simply driven at a frequency to correspond with the fundamental lateral resonant frequency, instead of the fundamental longitudinal resonant frequency. A 1½ wavelength lateral standing wave such as represented at $w$ in FIG. 3 can thus be set up in the bar or shank 130 of the plow of FIGS. 6 to 12 simply by running the oscillator 162 at the necessary higher frequency for this wave. And at such time, of course, the longitudinal vibration pattern is reduced in amplitude and activity by reason of moving away from the longitudinal resonant frequency.

Considering the latter case first, a lateral standing wave will be set up in the bars 130 which is generally like the one and one-half wavelength lateral standing wave $w$ set up in the bars 53 of FIG. 1. The plowshares thus vibrate, usually more or less bodily, in a direction at right angles to the length of the bars 130.

The trailor vehicle T, moving ahead, cases a bias force to be exerted horizontally and forwardly from the plowshare to the soil. Vibration of the plowshare is in a direction transversely of the length of the bar 130. As mentioned in the introductory portion of the specification, the surfaces defining the penetrating tip of the plowshare are nearly parallel with the direction of the bias force, causing a tendency for low acoustic coupling and moderate cavitation in that region. Coupling effectiveness along or adjacent the lowermost edge 126a of the plowshare may also be low enough to permit some degree of cavitation. Above the edge 126a, where the plowshare curves away from horizontal and towards the vertical, so as to be nearer to normal to the direction of bias force application, the coupling becomes progressively improved. It then finally deteriorates, and moderate cavitation may again appear, as the ground level is approached, all as explained hereinabove.

In the case of a longitudinal standing wave in the bars 130, such as diagrammed at *sl* in FIG. 9, and explained hereinabove, the plowshare vibrates in a direction longitudinally of the length of the bar, and therefore along a diagonal line which is at a substantial angle with vertical. The plowshare has a component of vertical vibration and a component of horizontal vibration. The bias force relation to the plowshare is just as in the case of the lateral mode of vibration, explained immediately above. Because of this bias force relation, reduced acoustic coupling, and cavitation, may here again be produced at the tip of the plowshare, and in some cases, to a limited extent, just above its lowermost edge 126a. Thereabove, as the curved plowshare surface steepens, and becomes less parallel to the bias force, and where the depth below ground level remains sufficient that the bias force can be sustained, the plowshare surface has good acoustic coupling to the soil, and the horizontal component of plowshare vibration produces good acoustic radiation into the soil. Still higher on the plowshare, the bias force is not well sustained by the earth, and cavitation can occur, with the characteristic consequences thereof as earlier described. Good acoustic soil conditioning effects are thus obtained, as set forth hereinabove.

FIG. 9 shows an optional but preferred feature which can be used with the embodiment of FIGS. 7 to 12, or with any of the other embodiments of the invention, as will become evident. This feature comprises a conduit 195 located just to the rear of the plowshare shank 130, supported by a clip 196 secured to mounting plate ear 144, and positioned to discharge fluid downwardly into the soil in the region of the plowshare. This conduit 195 is fed by a line 197 leading from a source of fluid supply, not shown. Such a conduit may be utilized for any one of several advantageous purposes, including the supplying of liquid fertilizer or soil chemicals into the soil, or the injection of soil stabilizer chemicals. In some cases, the purpose might be other than agricultural, and comprise, as a process, the plowing of the soil, and the injection thereinto and mixing therewith of a soil stabilizing or hardening chemical, such as to produce easily and at low expense a landing field, or a car parking area, for example.

Reference is next directed to FIGS. 17–19, showing, somewhat fragmentarily, a modification of the plow of FIGS. 6–12. The plow frame, designated generally at 200, may be substantially similar to that of FIGS. 6–12, and need not be further illustrated as described. It includes a longitudinally extending frame bar or strap 201. A plowshare 202, generally like the plowshare 126 previously described, and provided with a moldboard 203, is secured by means of frog 204 to landslide 205. This landslide 205 is secured to the lower end of an elastic bar or shank 206, which is preferably of rectangular cross section (FIG. 19), and is pivotally mounted somewhat above its lower end (at a node of the lateral standing wave therein, as hereinafter explained), on a mounting pin 208 carried by and between two horizontally spaced, vertically disposed mounting plates 209 and 210 which are secured to the frame member 201.

The shank 206 extends partially between the plates 209 and 210, which are spaced, back of said shank 206, by a spacer plate 212, at a spacing distance sufficient to permit free vibratory motion of the shank 206 in a transverse plane, i.e., parallel with the plates 209 and 210. Thus mounted and positioned for operation, the longitudinal axis of the shank 206 extends upwardly and somewhat rearwardly from the plowshare 202 on its lower end to a height which may be some feet above the frame member 201, as will be referred to again hereinafter. The angle of the bar 206 with vertical, in the example shown in FIGS. 17 to 19, is of the order of 10°, but this inclination is not critical, and may be less, or considerably greater.

The bar shank is yieldingly and resiliently restrained in the operative position illustrated against clockwise rotation on pivot pin 208 as the plowshare meets soil resistance, or, occasionally, a substantially sized rock, or an immovable boulder. To this end, the rearward edge portion of the shank 206 is formed with an upward opening notch 214, which receives a pin 215 (see also FIG. 19a) carried by an arm 216 pivotally mounted as at 217 on mounting plate 209. This arm 216 is yieldingly and resiliently held in a normal lowermost position, against a stop pin 218 mounted on plate 209, by means of a coil spring 219 connected between a midpoint of the arm 216 and an anchor pin 220 mounted on plate 209. The pin 215 carried by arm 216 projects laterally through a vertically elongated slot 222 in plate 209, so as to overlay the notch 214 in shank 206. As stated, the parts are normally in the position of FIG. 17, and in such position spring 219 holds pin 215 engaged downwardly in the notch 214 in the back edge of shank 206. In the event of substantial soil pressure on the forwardly moving plowshare 202, there is occasionally a rearward thrust thereon of sufficient magnitude that a certain yieldability becomes desirable. In such event, the shank 206 may swing clockwise by a short distance, the notch 214 elevating pin 215 and arm 216 for a short distance against the yielding but resilient restraint of the spring 219. The increasing resistance of the spring 219 as the arm 216 is thus elevated, together with the fact that the plowshare normally is so strongly resisted only momentarily, results for the most part in the shank 206 then immediately returning to the position of FIG. 18. In the event, on the other hand, of the plowshare coming into engagement with a large or even immovable boulder, the shank 206 can then swing to a more extreme clockwise angle, until it disengages from pin 215. The rearward edge of the notch 214 is, for this purpose, so shaped that when the shank 206 swings clockwise far enough, it cams the pin 215 upwardly and entirely out of the notch 214, so that the shank 206 is then free to rock through a very considerable angle, sufficient to permit passing over the obstruction.

A transverse elastic standing wave is set up in the shank 206, such as represented in the standing wave diagram *st* in FIG. 17. A portion of the bar 206 has been broken out in FIG. 17, and it is to be understood that the necessary bar length is a matter of choice, so long as the standing wave has an antinode at the bottom end and another antinode at the top end of the operating frequency, as diagrammed. Thus the only fundamental requirement is that the bar be driven at such a transverse vibration frequency as to produce a velocity antinode at each end of the shank, and a velocity node at its mounting point.

To set up the standing wave in the shank 206, a vibration generator 220 is employed, being mounted in this instance, on the lower end portion of the shank 206. As one illustrative example, the generator 220 may be of the same type as the generator 162 of FIGS. 9–16, and it may be driven, through a shaft 221, and a universal joint 222a, from a hydraulic motor 223 which may be like the hydraulic motor 155 of FIG. 9. As shown in FIGS. 17 and 18, the generator 220a and motor 223 are mounted upon shank 206 on an axis which extends longitudinally of the shank 206, with the generator 220a at the bottom, and the motor 223 at the top. The hydraulic motor 223 is shown furnished with hydraulic supply and return conduits 234 and 235, respectively, which will be understood to lead from a source of pressure fluid and a return reservoir, not shown. The pressure fluid source is of course under control, so as to permit regulation of the speed of motor 223 and therefore the output frequency of the vibration generator.

It will be appreciated, from a recollection of what has been said in the foregoing about the performance of the generator 152, that the generator 220a will exert a gyratory force against the lower end portion of shank 206, with a component of such force normal to the plane of the shank 206, and a component of such force in the plane of said shank and normal to the longitudinal axis thereof. The generator 220 is operated, by regulation of the hydraulic supply fluid to motor 223, at a frequency corresponding to a resonant frequency of the shank 206 for a transverse mode of standing wave vibration, such as typically diagrammed in FIG. 17 at $st$. A characteristic of the standing wave mode chosen is to provide a node N of the standing wave at the mounting pin 208 for the shank 206, and an antinode, V, at the mounting point of the generator 220a on the shank 206. The component of gyratory force delivered by generator 220a to the shank 206 which is in the plane of said shank then excites the resonant standing wave pattern in the shank, such as represented at $st$. The component of the output force of generator 220a which is normal to the shank 206 will then be at a frequency which, because of the cross-sectional geometry of the bar, is substantially removed from a resonant frequency for lateral bending in response to the last mentioned force component, so that only a negligible amount of transverse vibration occurs in the direction normal to the shank 206.

The operation of the device of FIGS. 17–19a is substantially that of the embodiment of FIGS. 9–16 when the generator of that embodiment is operated at a frequency to produce a lateral wave in the shank. A repeated description of this performance should therefore not be necessary.

FIGS. 20–24 show a further embodiment of the invention, of a disk-plow or harrow type. Numeral 250 designates generally a frame, of generally trapezoidal form, including short and long longitudinal outside angle frame members 251 and 252, and angularly disposed forward and rearward angle members 254 and 255, respectively. Frame 250 includes also a transverse angle member 258 joining longitudinal members 251 and 252, and may include such additional bracing structure as is necessary to afford a good rigid framework, the remaining details of which need not be discussed or disclosed herein since they are well within the skill of the art.

Connected to front angle frame member 254 is a hitch structure 260 to which is pivotally connected a drawbar 261 understood to be pulled by any suitable tractor vehicle, not shown. The entire framework is adapted to ride on wheels 264 rotatably mounted on suitable axles carried by a frame structure 266, the latter being pivotally mounted at 267 on brackets 268 secured to and projecting forwardly from angle frame member 258. In the example here given, the pivotal mounting at 267 comprises a shaft 270 journalled in brackets 268 and fixed tightly with frame structure 266. This shaft 270 carries an arm 271, to which is pivotally connected, as at 271a, a plunger shaft 272 extending from a plunger, not shown, working within a hydraulic cylinder 274 which is pivotally mounted at 275 on bracket 276 attached to front frame member 254. It will readily be understood that operation of a hydraulic jack will swing frame 266 and arm 270, as a bell crank, about pivot 267 to lower or raise wheels 264. Thus, the wheels may be lowered to raise the plow frame sufficiently to disengage the later described plow disks from the soil, or may be elevated relative to frame 250 sufficiently to provide for the desired engagement of the disks with the soil. For the operation of hydraulic cylinder 274, hydraulic lines 278 and 279 are provided, and will be understood to lead, through suitable control valves, to a source of pressure fluid and a return reservoir, whereby the plow may be selectively elevated or lowered at will.

A plurality of preferably concave disks 280 are mounted in axially spaced relation to each of a pair of horizontal shafts 281 and 282, composed of an elastic material, as steel, the former being positioned just to the rear of and below the level of the front angle frame member 254, and the latter just forwardly of and below the level of the rearward angle member 255. These shafts 281 and 282 may be hollow, as shown in FIG. 24, for desirable lightness. The disks 280 are mounted on the shafts 281 and 282 in any conventional or desired manner.

In the operation of the plow, lateral standing waves are set in the shafts 281 and 282, as represented for shaft 282 by the standing wave diagram $st'$ in FIG. 23. The lateral standing wave $st'$ will be seen to be, in this example, one full wavelength in overall length, with velocity antinodes V at the two ends, a velocity antinode V' at the center, and with nodes N at quarter wavelength distances from the two ends. These nodal points are accordingly appropriate places for mounting of the shafts 282 onto the frame; and to this end, hangers 285 secured to the front and rear frame members 254 and 255 mount the shafts 281 and 282 at the described nodal points.

The desired lateral standing waves in the bars or shafts 281 and 282 may be excited by applying the necessary vibration to the shafts at any velocity antinode of the wave, including the end point velocity antinodes V. Preferably, and as here shown, however, the vibrations are applied to the shafts 281 and 282 at the velocity antinode regions V' at the midpoints of the shafts 281 and 282. For this purpose, a collar 290 surrounds each of shafts 281 and 282 at its midpoint region, and is on a bracket arm 291 that extends downwardly from and is secured firmly to the underside of a mounting plate 292 which mounts, at one end thereof, directly over the bracket arm 291, a vibration generator 294. This vibration generator is again, illustratively, of the same type as that represented at 152 and described in connection with FIGS. 7 to 16. Thus, the generator 294 is driven through a shaft 295 and universal joints 296 from a hydraulic motor 297 mounted on the opposite end portion of mounting plate 292. The latter is supported, at the motor end thereof, through rubber mounting block 298, from a shelf 299 projecting from the corresponding frame angle member 254 or 255, as the case may be. Hydraulic motor 297 is supplied with pressure fluid through a supply line 300, and discharges spent fluid through return line 301, these lines being understood to connect to a suitable source of pressure fluid and a return reservoir, respectively, not shown, carried by the unillustrated tractor vehicle.

Hydraulic motor 297 is driven at the speed necessary to operate vibration generator 294 at the resonant frequency of the shaft 282 (or 281, as the case may be), for resonant standing wave vibration of the shaft 282 as, for example, in the lateral mode represented by the standing wave diagram $st'$ in FIG. 23. As with the earlier vibration generators described, the generator 294 delivers a gyratory output force to the end portion of the mounting plate of platform 292 and therefore to the upper end of bracket arm 291, which is in turn transmitted by said arm 291 to the collar 290 and thence to the midpoint region, or velocity antinode region V', of the shaft 282. The gyratory output force of the generator has, as before, components in two directions at right angles to one another. These two components are in so-called quadrature, i.e., are out of phase with one another by 90°. In other words, one passes through its maximum amplitude, and its other events of the cycle, one-quarter cycle ahead of the other. The over-all effect is a resultant force vector applied to the shaft 282 which rotates constantly about the longitudinal axis of said shaft. At the same time, it must be understood that this rotating force vector is the resultant of two components of oscillating force which are applied to the shaft 282 at right angles to one another, one along a vertical axis, and one along a horizontal axis, but with 90° phase difference. In modified forms of the invention, using generators designed for oscillating output forces along single direction lines, oscillating forces can be applied to shaft 282 in the vertical direction only, or in the horizontal direction only, giving lateral standing waves in the vertical plane only, or in the horizontal plane only. The preferred embodiment, however, utilizes both components, yielding a gyratory lateral standing wave as will now be more fully described.

The gyratory force, i.e., rotating force vector, developed within the vibration generator 294 and applied to the shaft 282 at substantially its midpoint, as aforesaid, has a frequency, established by proper speed regulation of the hydraulic motor 297, which equals or approximates the longitudinal resonant standing wave frequency of the elastic shaft 282 for a lateral mode of standing wave vibration in the shaft 282. Of course, the standing wave behavior of the shaft 282 is somewhat modified by the presence of the disks 280 mounted thereon, but may be understood sufficiently well if these disks are ignored for the time being. Under the influence of the gyratory force applied to the midpoint of the shaft 282, the shaft 282 does not rotate bodily, but portions thereof spaced from the nodal point or points of the gyratory standing wave gyrate in a circular path by corresponding elastic bending of portions of the shaft from its neutral position. As stated earlier, the nodal points N are the points where the shaft 282 is held by the support bracket, these points being spaced one-quarter of the length of the shaft from each of its ends. A velocity antinode V occurs at each of the ends of the shaft, and a velocity antinode V' occurs at the midpoint, where the shaft is driven from gyratory vibrations transmitted to it via the arm 291. A gyratory standing wave $st'$ is thus established, and is a form of harmonic lateral or transverse vibration, being specifically, the resultant of two components of linear transverse harmonic standing wave vibration patterns at right angles to one another and at 90° phase difference. The resultant gyratory vibration applied to the midpoint of the elastic shaft 282 is propagated longitudinally along the shaft at the speed of travel of transverse elastic waves. These are reflected from the ends of the shaft, and through interference with a succeeding outwardly propagated wave, the standing wave is established as will be clearly appreciated by those skilled in the acoustics art. The effect, then, is that the several segments of the shaft 282 between and outside the mounting brackets 235 undergo gyratory elastic bending, with amplitudes along the shaft which vary from a minimum at the nodal points (periods of support by the hangers 285) to substantial magnitudes at the velocity antinode regions V and V'.

Clearly, the disks mounted on the gyrating shaft 282 undergo corresponding bodily movements. These movements are compound and somewhat complex, but it will be evident that they include components of vibratory movement normal to the surfaces of the disk, and generally or primarily sidewise in direction. The motion may be described as a gyratory rocking action, with components of vibratory motion normal to the surfaces of the disk. These normal components of oscillation or vibration couple effectively to the soil in engagement with the surfaces of the disk. The disks are oriented such that leading portions thereof cut into the soil in a slicing manner, and the soil then moves across the surfaces of the disk, as the latter vibrates against them. As suggested hereinabove, the direction of vibration against the soil, and thus the direction of acoustic radiation, is in a direction which is primarily lateral or sidewise, speaking of course with reference to the forward travel of the tractor.

As seen best in FIG. 20, the disk shafts 281 and 282 are set at opposite angles relative to the direction of travel of the plow. Also, the disks are mounted on the two shafts with their concave sides all facing towards one side of the plow. Accordingly, the front and rearward sets of disks are oriented differently relative to the direction of travel of the plow. The nature of the acoustic coupling to the soil will correspondingly be different for the two cases.

Directing attention first to the forward disks, it will be seen that the leading edge portions thereof, especially in and near the horizontal plane of the disk mounting shaft 281, are nearly parallel with the direction of travel of the plow. The inclination of the disks increases in the rearward direction owing to their curvatures, and in the aft half-portions of the disk becomes quite substantial. The case is the opposite for the rearward disks, whose inclination relative to the direction of travel of plow is quite substantial for the forward half portions of the disks, decreasing some of course, in the rearward direction, and the surfaces of these disks approach parallelism with the direction of travel in the aft portions thereof.

Redirecting attention to the forward disks, it will be seen that these are advantageously oriented to cut and slice easily into the soil, in that the forward portions thereof are in positions approaching parallelism with the directions of travel. As the disks penetrate the soil, the soil slides rearwardly along the surfaces thereof, and on the concave sides of the disks, the soil is progressively crowded laterally and so placed in a degree of compression or compaction. A lateral bias force is thus exerted. Thus, the leading edge portions of the front disks, because of absence of substantial bias force applications, acoustically couple only moderately with the soil, the coupling condition being that characterized by a degree of cavitation, with effects on the soil similar to those described hereinabove with other forms of vibratory soil engaging members under such combinations of bias pressure, soil resistance, and amplitude of vibrations such as produces a cavitating type of operation. Further back on the front disks, where the curvature of the disks causes the disk surfaces to face more forwardly, the soil is crowded laterally and the degree of compression or compaction rises. This leads to a condition wherein the bias pressure, and accordingly the acoustic coupling, are materially increased. The acoustic coupling can reach a fairly high degree as the soil slides around the last part of the curve of the disk. Thus, acoustic wave radiation into the soil, and corresponding sonic agitation of the soil, including the fluidizing effects and the benefits thereof as discussed amply hereinabove are attained as the soil slides around or across the surfaces of the disks.

Directing attention now to the rearward disks, it will be clear that the soil encountered by said disks has already been through the sonic wave treatment produced by the front disks, and is already in considerably broken up and loosened condition. This soil is penetrated by the rearward disks, and slides over the convex surfaces thereof, which, in the forward portions of the disk, face fairly well forwardly. Thus, the curvatures of the rearward disks, in the front portion thereof, and on the convex sides, results in the soil being crowded laterally, so as to provide a lateral bias pressure. Imposed on this bias pressure is the vibratory action of the disk, characterized by a substantial component of motion normal to the surfaces of the disks. The soil as it sweeps around the front half portions of the disk is thus in a substantial degree of acoustic coupling relationship with the disks, especially on the convex surfaces thereon, and receives or is subject to sonic wave agitation such as tends further to disintegrate and fluidize it. The coupling in the front portions of the rearward disks is farily good, and is generally without cavitation. As the disks curve more toward parallelism with the direction of travel in their middle and then rearward portions, the degree of lateral bias pressure is reduced, and a trend towards cavitation sets in, with the characteristic results of cavitation as discussed hereinabove.

As mentioned hereinabove, in certain embodiments of the invention, a sonic standing wave is set up in a longitudinally extended bar or shank, such that velocity antinodes appear at the ends of the shank. A vibration generator may be mounted at one end of this shank, and a plowshare (or disk) at the other. The plowshare (or disk) then generally vibrates more or less bodily, or as a "lumped constant" element, on the sonically vibrating end portion of the bar or shank. However, under certain circumstances, a part of the standing wave pattern may extend into and throughout the plowshare, or the disk in the case of a disk plow. This condition can be easily established by operating the vibration generator at a harmonic of the fundamental standing wave frequency of the system. In such a way, cyclic elastic deformation waves or vibrations are extended into the plowshare itself.

As mentioned in the introductory portion of the specification, the elastically vibratory member, in which the resonant vibration pattern is established, and which may aptly be called the resonator, has the property, when vibrating at resonance, of counteracting or balancing out force wasting masses of the vibratory system, such as the masses of the vibration generator, the vibratory elastic bar, and of plowshares or disks in cases where they are used. In this connection, it will be seen that I have provided three acoustically intercoupled components, the vibration generator, or oscillator, the resonator, and a soil engaging sonic wave radiator element. In the case of the simple bar form (FIGS. 1-5), the oscillator and wave radiator element are physically combined in one physical structure, with the earth-engaging wave radiating surface on the bar functioning as the third or wave radiator element. Even in this case, however, functionally and acoustically speaking, there are three separate but acoustically intercoupled elements, viz., oscillator, resonator and radiator. In the plowshare and disk forms, of course, the plowshare or disk, as the case may be, comprise the radiator, the elastic mounting shank, or shaft, respectively, constitute the resonator, and the vibration generator is again the oscillator. Also, it is to be pointed out that the vibration generator or oscillator need not be at the opposite end of the elastic bar (resonator) from the radiator (e.g., plowshare). Thus, in FIGS. 17-19, the vibration generator or oscillator is coupled in at the same end of the elastic bar, or resonator, as the plowshare. The combination of these three intercoupled elements, oscillator, resonator, and radiator, is directly responsible for the acoustic power and effectiveness of the invention.

In final summary, it is desired to emphasize again that the soil penetrating members of the invention, whether consisting of bars, plowshares or disks, act to cut the soil, break and fluidize it, turn or displace it a short distance, and then spill or release and redeposit it, substantially in situ, i.e., almost where it was cut loose. Thus the invention is concerned with an agricultural tilling process and system, which loosens, breaks, fluidizes and generally conditions the soil, and then drops it back almost in its original location.

From what has now been said, it will be understood that the various forms of the invention disclosed herein all produce a number of soil breaking and conditioning effects as discussed in the introductory portion of the specification. A number of different forms of apparatus in accordance with the invention for carrying out the broad process of the invention have been disclosed, but it will be understood that these are for illustrative purposes, and that various additional types and forms of apparatus may be contrived within the broad scope of the invention as defined by the broader of the appended claims.

I claim:
1. In a sonic earth cultivator machine for tilling the soil in situ to cultivation depth, the combination of:
    an elastically vibratory soil cultivator member having a soil penetrating portion shaped and dimensioned to penetrate soil to cultivation depth and adapted to be moved horizontally in a given direction through the soil,
    said soil penetrating portion of said member having an extended acoustic wave radiation surface thereon which is angularly disposed relative to and faces at least partially in said given direction of movement thereof through the soil,
    vibration generating means coupled to said elastically vibratory soil cultivator member, said generating means having an operating frequency set relative to the mass and elasticity of said cultivator member so as to establish an elastic standing wave pattern, with vibration of said soil penetrating portion characterized by a component of vibration normal to said acoustic wave radiation surface, and
    means for supporting and transporting said cultivator member and vibration generating means for said horizontal movement with said soil penetrating portion of said member engaged with the soil to cultivation depth, and with said wave radiation surface thereon pressed against and thereby acoustically coupled to the soil by virtue of such horizontal movement,
    all soil penetrating portions of said machine being shaped and arranged for continuous release and redeposit of the tilled soil, substantially in situ, after the soil has passed over said portions, as said portions move progressively through the soil.
2. The subject matter of claim 1, wherein said soil penetrating portion of said cultivator machine has an advanced soil cutting edge, and said sonic wave radiation surface is located adjacent to and rearwardly of said cutting edge, whereby the soil cut by said edge slides progressively over said radiation surface.
3. The subject matter of claim 2, wherein said sonic wave radiation surface slopes generally upwardly and rearwardly from said cutting edge.
4. The subject matter of claim 1, wherein said elastically vibratory soil cultivator member comprises an elastic bar and said soil penetrating portion of said cultivator members comprises an end portion of said bar,
    wherein said vibration generating means is arranged and operable for setting up in said bar a lateral elastic resonant standing wave, and
    wherein said bar is supported at a nodal point of said standing wave.
5. The subject matter of claim 4, wherein said elastic bar is disposed on said supporting and transporting means in a generally downwardly and forwardly sloping position.
6. The subject matter of claim 1, wherein said elastically vibratory soil cultivator member comprises an elastic bar and said soil penetrating portion of said cultivator member comprises an end portion of said bar,
    wherein said vibration generating means is arranged and operable for setting up in said bar a longitudinal elastic resonant standing wave, and
    wherein said bar is supported at a nodal point of said standing wave.
7. The subject matter of claim 1, wherein said elastically vibratory soil cultivator member comprises an elastic bar having a lower end and said soil penetrating portion of said cultivator member comprises
    a plowshare on said lower end of said bar, and
    wherein said elastic wave generator is arranged and operable for setting up in said bar a lateral elastic resonant standing wave.
8. The subject matter of claim 1, wherein said elastically vibratory soil cultivator member comprises an elastic bar having a lower end and said soil penetrating portion of said cultivator member comprises
    a plowshare on said lower end of said bar, and
    wherein said elastic wave generator is arranged and operable for setting up in said bar a longitudinal elastic resonant standing wave.

9. The subject matter of claim 1, wherein said elastically vibratory soil cultivator member comprises an elastic bar having a lower end and said soil penetrating portion of said cultivator member comprises
    a plowshare on said lower end of said bar, and
    wherein said elastic wave generator is arranged and operable for setting up in said bar and in said plowshare an elastic resonant standing wave pattern.

10. The subject matter of claim 1, wherein said soil penetrating portion of said soil cultivator member is a plow disk.

11. The subject matter of claim 1, wherein said elastically vibratory soil cultivator member comprises a horizontally disposed elastic shaft and said soil penetrating portion of plow disks mouned in spaced relation on said shaft, and
    wherein said elastic wave generator is arranged and coupled to said shaft for setting up in said shaft a transverse gyratory elastic resonant standing wave.

12. The subject matter of claim 1, wherein said elastically vibratory soil cultivator member comprises a horizontally disposed elastic shaft and said soil penetrating portion thereon comprises a plurality of plow disks mounted in spaced relation on said shaft, and
    wherein said elastic wave generator is arranged and coupled to said shaft for setting up in said shaft a transverse elastic resonant standing wave.

13. The subject matter of claim 12, wherein said horizontally disposed elastic shaft is disposed on an axis which extends diagonally across said direction of horizontal movement, and wherein said disks are concavo-convex in form, and are so positioned by said diagonally oriented shaft that the concave sides thereof face partially in said direction of horizontal movement.

14. The subject matter of claim 12, wherein said horizontally disposed elastic shaft is disposed on an axis which extends diagonally across said direction of horizontal movement, and wherein said disks are concavo-convex in form, and are so positioned by said diagonally oriented shaft that the convex sides thereof face partially in said direction of horizontal movement.

15. The subject matter of claim 12, including
    means on said supporting and transporting means for supporting said shafts at nodal points of said standing wave.

16. The subject matter of claim 1, including also means mounted on said machine in close proximity to said soil cultivator element for discharging fluid into the soil during tilling.

17. In a sonic earth cultivator machine for tilling the soil in situ to cultivation depth, the combination of:
    a sonic oscillator,
    a vibratory soil cultivator element adapted for penetration into the soil to cultivation depth and for horizontal movement in a given direction through the soil, said element embodying an extended acoustic wave radiation surface which is angularly disposed relative to and faces at least partially in said given direction of movement,
    said soil cultivator element, said oscillator, and said resonator being acoustically intercoupled with one another, whereby said resonator and said soil cultivator element are vibrated by said oscillator,
    means for driving said oscillator at a resonant frequency at which the elasticity reactance of said resonator substantially counterbalances the mass reactance of the vibratory system constituted of the oscillator, the resonator and the soil cultivator element,
    means for supporting and transporting said soil cultivator element, said oscillator and said driving means for said horizontal movement in said given direction with said soil cultivator element penetrated into the soil to cultivation depth and with said wave radiation surface thereof pressed against and thereby acoustically coupled to the soil by virtue of such horizontal movement,
    all soil penetrating portions of said machine being shaped and arranged for continuous release and redeposit of the tilled soil, substantially in situ, after the soil has passed over said portions, as said portions move progressively through the soil.

References Cited by the Examiner
UNITED STATES PATENTS

| | | | |
|---|---|---|---|
| 1,276,843 | 8/1918 | Wentworth | 172—1 |
| 2,641,173 | 6/1953 | Rhoten | 172—40 |
| 2,690,902 | 10/1954 | Ream | 37—42 |
| 3,030,715 | 4/1962 | Bodine | 37—195 |

ABRAHAM G. STONE, *Primary Examiner.*

T. GRAHAM CRAVER, *Examiner.*